US012447756B2

(12) United States Patent
Washio et al.

(10) Patent No.: US 12,447,756 B2
(45) Date of Patent: Oct. 21, 2025

(54) PRINTING APPARATUS

(71) Applicant: SEIKO EPSON CORPORATION, Tokyo (JP)

(72) Inventors: Yuichi Washio, Shiojiri (JP); Kazutoshi Fujisawa, Okaya (JP); Satoru Katagami, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 119 days.

(21) Appl. No.: 18/182,902

(22) Filed: Mar. 13, 2023

(65) Prior Publication Data

US 2023/0286293 A1 Sep. 14, 2023

(30) Foreign Application Priority Data

Mar. 14, 2022 (JP) ................................ 2022-039010

(51) Int. Cl.
*B41J 11/00* (2006.01)
*B41J 29/02* (2006.01)

(52) U.S. Cl.
CPC .......... *B41J 11/0015* (2013.01); *B41J 11/007* (2013.01); *B41J 29/02* (2013.01)

(58) Field of Classification Search
CPC ...... B41J 11/0015; B41J 11/007; B41J 29/02; B41J 11/0024; B41J 11/0022; B41J 29/393
USPC .......................................................... 347/102
See application file for complete search history.

(56) References Cited

U.S. PATENT DOCUMENTS 11,173,727 B2 11/2021 Toyama et al.
2001/0024216 A1* 9/2001 Kim ..................... B41J 2/16547 347/32
2008/0231655 A1* 9/2008 Yamada ............... B41J 2/16511 347/29
2011/0205282 A1* 8/2011 Houjou .................. B41J 11/002 347/102
2016/0101635 A1* 4/2016 Hoshino .............. B41J 11/0015 347/102
2020/0384780 A1* 12/2020 Toyama ................. B41J 11/002

FOREIGN PATENT DOCUMENTS

JP 2020-199660 A 12/2020

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A drying unit includes a housing and a first contact heating unit. The first contact heating unit is provided inside the housing. The first contact heating unit includes a first contact heating surface configured to come into contact with a back surface of a medium after printing. The first contact heating unit can change posture from first posture to second posture, in a state where a first engagement portion engages with a first guide portion of a first support portion and a second engagement portion engages with a second guide portion of a second support portion, by a movement from a first position where the first contact heating surface faces the back surface of the medium after printing to a second position where the first contact heating surface is more separated from the back surface of the medium after printing as compared to the first position.

15 Claims, 7 Drawing Sheets

PRINTING APPARATUS

The present application is based on, and claims priority from JP Application Serial Number 2022-039010, filed Mar. 14, 2022, the disclosure of which is hereby incorporated by reference herein in its entirety.

BACKGROUND

1. Technical Field

The present disclosure relates to a printing apparatus that performs printing on a medium by discharging liquid onto the medium, and dries the medium after printing.

2. Related Art

For example, JP-A-2020-199660 discloses a printing apparatus that performs printing on a medium by discharging liquid onto the medium transported in a transport direction. The printing apparatus includes a drying unit that dries the medium after printing. As such a drying unit, there is a drying unit that includes a housing, and a contact heating unit provided inside the housing. The contact heating unit dries the medium after printing by coming into contact with the medium after printing.

In such a printing apparatus, in order to improve drying efficiency of the medium after printing and to reduce a size of the printing apparatus, for example, improving a configuration of the drying unit, such as saving space between the housing and the contact heating unit is desired.

However, in such a printing apparatus, depending on the configuration of the drying unit, there is a possibility that workability of work related to the contact heating unit is reduced.

SUMMARY

A printing apparatus for resolving the problem described above includes a transport unit configured to transport a medium in a transport direction, a printing unit configured to perform printing on the medium by discharging liquid onto the medium transported by the transport unit, and a drying unit configured to dry the medium after printing on which printing was performed by the printing unit, wherein the drying unit includes a housing, a first contact heating unit provided inside the housing, a first support portion provided inside the housing and provided at one of positions sandwiching the first contact heating unit in the transport direction, and a second support portion provided inside the housing and provided at another of the positions sandwiching the first contact heating unit in the transport direction, the first support portion and the second support portion are configured to support the first contact heating unit, the first support portion includes a first guide portion provided at a position facing the first contact heating unit, the second support portion includes a second guide portion provided at a position facing the first contact heating unit, the first contact heating unit includes a first contact heating surface facing a back surface of the medium after printing and configured to come into contact with the back surface of the medium after printing, the back surface of the medium after printing being opposite to a printing surface of the medium after printing, a first engagement portion configured to engage with the first guide portion, and a second engagement portion configured to engage with the second guide portion, and the first contact heating unit is configured to change posture from first posture to second posture, in a state where the first engagement portion engages with the first guide portion and the second engagement portion engages with the second guide portion, by a movement from a first position where the first contact heating surface faces the back surface of the medium after printing to a second position where the first contact heating surface is more separated from the back surface of the medium after printing as compared to the first position.

DESCRIPTION OF EXEMPLARY EMBODIMENTS

First Exemplary Embodiment

An exemplary embodiment of a printing apparatus will be described below with reference to the accompanying drawings. In the following description, a short direction of a medium M is referred to as a width direction X, and a direction intersecting (e.g., orthogonal) the width direction X and a vertical direction Z is referred to as a longitudinal direction Y. One side of the width direction X is referred to as a first width direction X1, and another side of the width direction X is referred to as a second width direction X2. One side of the longitudinal direction Y is referred to as a first longitudinal direction Y1, and another side of the longitudinal direction Y is referred to as a second longitudinal direction Y2. An upper side of the vertical direction Z is referred to as an upside Z1, and a lower side of the vertical direction Z is referred to as a downside Z2. Also, a direction in which the medium M is transported is referred to as a transport direction D.

Configuration of Printing Apparatus 10

Figure 1:
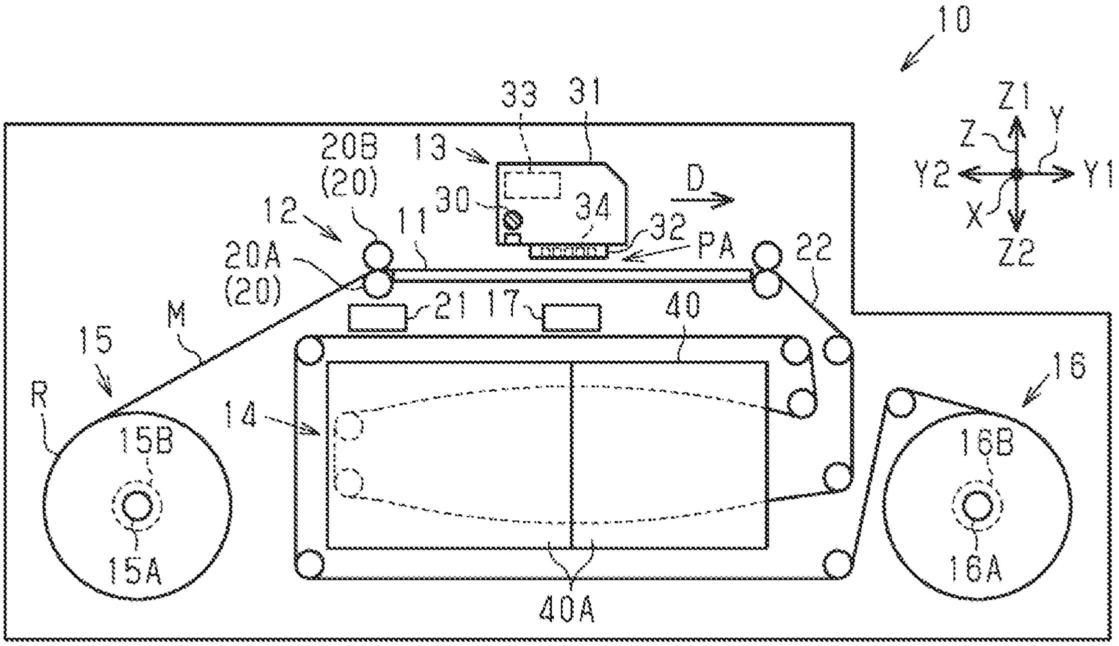
FIG. 1 is a front view schematically illustrating a printing apparatus.

As illustrated in FIG. 1, the printing apparatus 10 may be a roll-to-roll type printing apparatus, for example. The roll-to-roll type printing apparatus performs printing on the medium M as a continuous sheet. The printing apparatus 10 may be a printer that performs printing on a label sheet as the medium M. The printing apparatus 10 may be a serial printing type inkjet printer.

The printing apparatus 10 includes a support portion 11, a transport unit 12, and a printing unit 13. The support portion 11 is configured to support the medium M. In particular, the support portion 11 supports the medium M transported by the transport unit 12, in a printing area PA where printing is performed by the printing unit 13.

The printing apparatus 10 may include a feeding unit 15. The feeding unit 15 feeds the medium M. The feeding unit 15 includes a support shaft 15A, and a feeding motor 15B. The support shaft 15A rotatably supports a roll body R in which the medium M is wound into a roll shape. The feeding motor 15B is a power source that rotates the support shaft 15A. In the feeding unit 15, the support shaft 15A is rotated by driving of the feeding motor 15B, and thus the long medium M is fed from the roll body R.

The transport unit 12 is configured to transport the medium M in the transport direction D. The transport unit 12 transports the medium M fed by the feeding unit 15 in the transport direction D. The transport unit 12 includes a transport roller pair 20, and a transport motor 21. The transport roller pair 20 is provided upstream the printing unit 13 in the transport direction D. The transport roller 20 includes a transport driving roller 20A, and a transport driven roller 20B. The transport driving roller 20A is rotatable by driving of the transport motor 21. The transport driven roller 20B corotates with rotation of the transport driving roller 20A to rotate. The transport motor 21 is a power source of the transport driving roller 20A. The transport unit 12 transports the medium M fed from the feeding unit 15 in the transport direction D in a state of nipping the medium M, by the transport driving roller 20A rotating by driving of the transport motor 21. In this manner, the transport unit 12 is configured to transport the medium M in the transport direction D along a transport path 22. That is, the printing apparatus 10 includes the transport path 22 through which the medium M is transported.

The printing apparatus 10 may include a winding unit 16. The winding unit 16 winds the medium M after printing in a roll shape. The winding unit 16 includes a winding shaft 16A and a winding motor 16B. The winding shaft 16A supports the medium M after printing. The winding motor 16B is a drive source of the winding shaft 16A. The winding unit 16 winds the medium M by the winding shaft 16A rotating by driving of the winding motor 16B. The winding unit 16 may include a tension applying unit that applies tension to the medium M after printing.

The printing unit 13 is configured to perform printing on the medium M supported by the support portion 11. The printing unit 13 includes a guide shaft 30, a carriage 31, a liquid discharging head 32, and a carriage motor 33. The guide shaft 30 is provided along the width direction X. The carriage 31 is supported by the guide shaft 30. The carriage 31 supports the liquid discharging head 32. The carriage 31 is scanned along the axial direction of the guide shaft 30 by driving of the carriage motor 33. That is, the carriage 31 is scanned along the width direction X.

The liquid discharging head 32 is provided on the lower Z2 side in the vertical direction Z of the carriage 31. The liquid discharging head 32 includes a plurality of nozzles 34 from which liquid is discharged. The plurality of nozzles 34 open toward the medium M supported by the support portion 11. The liquid discharging head 32 discharges the liquid from the plurality of nozzles 34 toward the medium M supported by the support portion 11. In this way, the printing unit 13 is configured to perform printing on the medium M by discharging the liquid onto the medium M transported by the transport unit 12.

The liquid discharging head 32 is of a serial head type that discharges the liquid as the carriage 31 moves in the width direction X, but may be of a line head type. For example, the liquid may be ink, for example. The liquid may have, for example, one type of color or a plurality of types of colors.

In this manner, the printing apparatus 10 performs printing on the entire medium M, by alternately performing transport operation and printing operation. The transport operation is operation of causing the transport unit 12 to transport the medium M. The printing operation is operation of causing the liquid discharging head 32 to jet the liquid onto the medium M supported by the support portion 11 while reciprocating the carriage 31.

The printing apparatus 10 includes a drying unit 14. The drying unit 14 is positioned downstream the printing unit 13 in the transport direction D. The drying unit 14 is configured to dry the medium M after printing by the printing unit 13. The drying unit 14 includes a housing 40. The transport path 22 passes through inside the housing 40.

The housing 40 may include a swing door 40A. The swing door 40A is provided on the first width direction X1 side of the housing 40. In a state where the swing door 40A of the drying unit 14 is closed, the medium M transported through the transport path 22 can be dried. In a state where the swing door 40A of the drying unit 14 is open, the medium M can be installed inside the housing 40 by a user. In the state where the swing door 40A of the drying unit 14 is open, an inside of the housing 40 can be maintained by the user.

The printing apparatus 10 includes a control unit 17. The control unit 17 may comprehensively control the printing apparatus 10, and may control various types of operation performed in the printing apparatus 10. In particular, the control unit 17 can control the transport unit 12, the printing unit 13, the drying unit 14, the feeding unit 15, and the winding unit 16. That is, the control unit 17 is configured to perform control related to printing on the medium M. The control unit 17 may include one or more processors that perform various processes according to a program, one or more dedicated hardware circuits, such as an application-specific integrated circuit, that performs at least some of the various processes, or a combination thereof. The processor includes a CPU and a memory such as RAM and ROM, and the memory stores a program code or a command configured to cause the CPU to perform the process. The memory, that is, a computer-readable medium includes all kinds of readable media accessible by a general purpose or dedicated computer.

Configuration of Drying Unit 14

Figure 2:
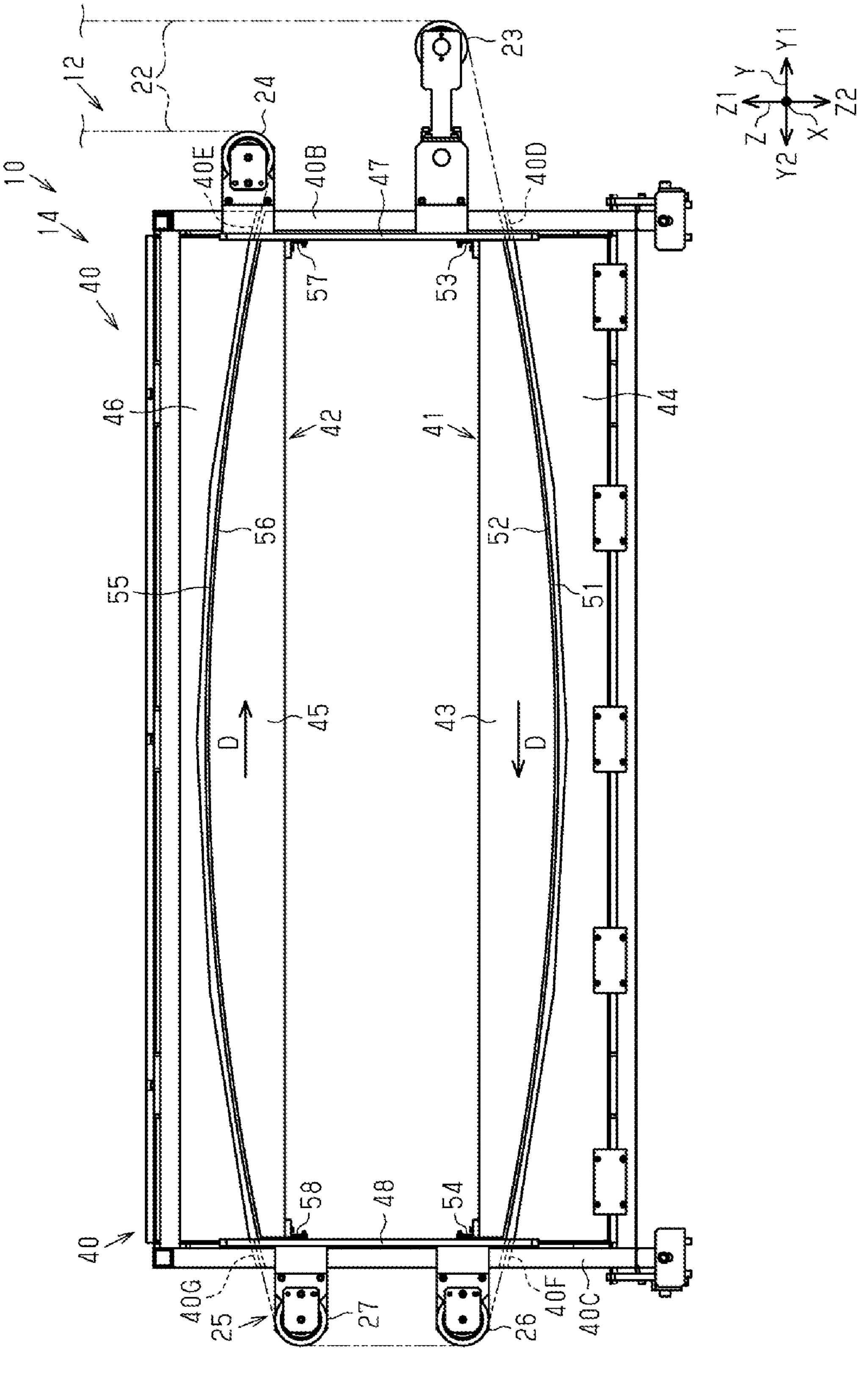
FIG. 2 is a front view illustrating a drying unit and a transport unit.

As illustrated in FIG. 2, in the drying unit 14, the housing 40 includes a first side wall 40B, and a second side wall 40C. The first side wall 40B is a wall portion on the first longitudinal direction Y1 side of the housing 40. The second side wall 40C is a wall portion in the second longitudinal direction Y2 of the housing 40. Note that in FIG. 2, illustration of the transport path 22 inside the housing 40 is omitted.

The housing 40 includes a supplying port 40D. The supplying port 40D is provided at the first side wall 40B. The supplying port 40D is an opening for transporting the medium M after printing from an outside of the housing 40 to the inside of the housing 40. In other words, the supplying port 40D is an opening for transporting the medium M after printing from an outside of a first drying unit 41 described below to an inside of the first drying unit 41.

The housing 40 includes a discharge port 40E. The discharge port 40E is provided at the first side wall 40B. The discharge port 40E is an opening for transporting the medium M after printing from the inside of the housing 40 to the outside of the housing 40. In other words, the discharge port 40E is an opening for transporting the medium M after printing from an inside of a second drying unit 42 described below to an outside of the second drying unit 42.

The housing 40 includes a first communication port 40F. The first communication port 40F is provided at the second side wall 40C. The first communication port 40F is an opening for transporting the medium M after printing from the inside of the first drying unit 41 described below to the outside of the first drying unit 41.

The housing 40 includes a second communication port 40G. The second communication port 40G is provided at the second side wall 40C. The second communication port 40G is an opening for transporting the medium M after printing from the outside of the second drying unit 42 described below to the inside of the second drying unit 42.

The drying unit 14 may include the first drying unit 41. The first drying unit 41 is provided inside the housing 40. The first drying unit 41 dries the medium M after printing transported from the supplying port 40D.

The drying unit 14 may include the second drying unit 42. The second drying unit 42 is provided inside the housing 40. The second drying unit 42 dries the medium M after printing transported from the second communication port 40G.

The first drying unit 41 is positioned upstream the second drying unit 42 in the transport direction D. In the first drying unit 41, a direction toward the second longitudinal direction Y2 is the transport direction D. In the second drying unit 42, a direction toward the first longitudinal direction Y1 is the transport direction D.

The first drying unit 41 includes a first contact heating unit 43. That is, the drying unit 14 includes the first contact heating unit 43. The first contact heating unit 43 is provided inside the housing 40. The first contact heating unit 43 is provided at a position facing a back surface of the medium M after printing. The back surface of the medium M after printing is a surface on an opposite side to a printing surface of the medium M after printing. The first contact heating unit 43 dries the medium M after printing by coming into contact with the back surface of the medium M after printing.

The first contact heating unit 43 includes a first contact heating surface 51. The first contact heating surface 51 is a surface facing the back surface of the medium M after printing, in the first contact heating unit 43. The first contact heating surface 51 is configured to come into contact with the back surface of the medium M after printing. The first contact heating surface 51 is positioned facing a second contact heating surface 55 described below in an opposite direction. The first contact heating surface 51 may be a surface that has an area larger than that of a support surface on which the medium M is supported in the support portion 11.

The first contact heating surface 51 is curved to have a shape protruding toward the lower Z2 side in the vertical direction Z. That is, the first contact heating surface 51 is curved to have a shape protruding toward a first non-contact heating unit 44 described below. In other words, the first contact heating surface 51 is curved to have a shape protruding toward a direction opposite to the second contact heating surface 55 described below.

The first contact heating surface 51 may be a surface formed of a metal plate material, or may be a surface formed of an aluminum plate material, for example. In particular, the first contact heating surface 51 may be configured to curve along a support member (not illustrated). Further, for the first contact heating surface 51, a radius of curvature may be adopted that increases a degree of close contact with the medium M after printing, while suppressing an increase in size in the vertical direction Z of the drying unit 14.

Additionally, a surface of the first contact heating surface 51 that comes into contact with the back surface of the medium M after printing may be subjected to electroless Ni plating. In a specific example, a thickness of the first contact heating surface 51 may be about 3 mm, and a thickness of the electroless Ni plating may be about 10 μm. In this way, the first contact heating surface 51 is configured to reduce friction force with the back surface of the medium M after printing, when coming into contact with the back surface of the medium M after printing.

The first contact heating unit 43 includes a first heater 52. The first heater 52 may be a rubber heater provided at a back surface of the first contact heating surface 51. The first heater 52 heats the first contact heating surface 51. Accordingly, the first contact heating unit 43 dries the medium M after printing coming into contact with the first contact heating surface 51.

The first contact heating unit 43 includes a first engagement portion 53, and a second engagement portion 54. The first engagement portion 53 is provided on the first longitudinal direction Y1 side of the first contact heating unit 43. The first engagement portion 53 can engage with a first support portion 47 described below. The second engagement portion 54 is provided on the second longitudinal direction Y2 side of the first contact heating unit 43. The second engagement portion 54 can engage with a second support portion 48 described below. In this manner, the first contact heating unit 43 is supported by the first support portion 47 and the second support portion 48 described later.

The first drying unit 41 may include the first non-contact heating unit 44. That is, the drying unit 14 may include the first non-contact heating unit 44. The first non-contact heating unit 44 is provided inside the housing 40. The first non-contact heating unit 44 is disposed facing the first contact heating unit 43. Particularly, the first non-contact heating unit 44 is disposed facing the first contact heating surface 51. The first non-contact heating unit 44 is disposed with the transport path 22 sandwiched between the first non-contact heating unit 44 and the first contact heating unit 43.

The first non-contact heating unit 44 is configured to blow air to the printing surface of the medium M after printing in a state of not being in contact with the printing surface of the medium M after printing. Specifically, the first non-contact heating unit 44 may include a heater (not illustrated), a blower (not illustrated), and a plurality of air blowing ports (not illustrated). The plurality of air blowing ports (not illustrated) are provided at positions facing the transport path 22. The first non-contact heating unit 44 heats internal air by the heater. The first non-contact heating unit 44 blows the heated air from a plurality of blowing nozzles by driving of the blower. In this manner, the first non-contact heating unit 44 dries the medium M after printing by blowing air to the printing surface of the medium M after printing, without coming into contact with the printing surface of the medium M after printing.

In the first drying unit 41, the first contact heating unit 43 and the first non-contact heating unit 44 are provided separated by a predetermined distance. In the first drying unit 41, the first contact heating unit 43 and the first non-contact heating unit 44 are provided sandwiching the transport path 22. As the predetermined distance, a minimum distance is adopted to increase drying efficiency of the medium M, and to reduce a size of the drying unit 14. The predetermined distance may be, for example, about 15 mm.

The second drying unit 42 includes a second contact heating unit 45. That is, the drying unit 14 may include the second contact heating unit 45. The second contact heating unit 45 is provided inside the housing 40. The second contact heating unit 45 is provided at a position facing the back surface of the medium M after printing. The second contact heating unit 45 dries the medium M after printing by coming into contact with the back surface of the medium M after printing.

The second contact heating unit 45 includes the second contact heating surface 55. The second contact heating surface 55 is a surface facing the back surface of the medium M after printing in the second contact heating unit 45. The second contact heating surface 55 is configured to come into contact with the back surface of the medium M after printing. The second contact heating surface 55 is positioned facing the first contact heating surface 51 in an opposite direction. The second contact heating surface 55 may be a surface that has an area larger than that of the support surface on which the medium M is supported in the support portion 11.

The second contact heating surface 55 is curved to have a shape protruding toward the upper Z1 side in the vertical direction Z. That is, the second contact heating surface 55 is curved to have a shape protruding toward a second non-contact heating unit 46 described below. In other words, the second contact heating surface 55 is curved to have a shape protruding toward a direction opposite to the first contact heating surface 51.

The second contact heating surface 55, similar to the first contact heating surface 51, may be a surface formed of a metal plate material, or may be a surface formed of, for example, an aluminum plate material. In particular, the second contact heating surface 55 may be configured to curve along a support member (not illustrated). Further, for the second contact heating surface 55, a radius of curvature may be adopted that increases a degree of close contact with the medium M after printing, while suppressing an increase in size in the vertical direction Z of the drying unit 14.

Additionally, a surface of the second contact heating surface 55 that comes into contact with the back surface of the medium M after printing may be subjected to electroless Ni plating. In a specific example, a thickness of the second contact heating surface 55 may be about 3 mm, and a thickness of the electroless Ni plating may be about 10 μm. In this way, the second contact heating surface 55 is configured to reduce friction force with the back surface of the medium M after printing, when coming into contact with the back surface of the medium M after printing.

The second contact heating unit 45 includes a second heater 56. The second heater 56 may be a rubber heater provided at a back surface of the second contact heating surface 55. The second heater 56 heats the second contact heating surface 55. Accordingly, the second contact heating unit 45 dries the medium M after printing coming into contact with the second contact heating surface 55.

The second contact heating unit 45 includes a third engagement portion 57 and a fourth engagement portion 58. The third engagement portion 57 is provided on the first longitudinal direction Y1 side of the second contact heating unit 45. The third engagement portion 57 can engage with the first support portion 47 described below. The fourth engagement portion 58 is provided on the second longitudinal direction Y2 side of the second contact heating unit 45. The fourth engagement portion 58 can engage with the second support portion 48 described below. In this manner, the second contact heating unit 45 is supported by the first support portion 47 and the second support portion 48 described later.

The second drying unit 42 includes the second non-contact heating unit 46. That is, the drying unit 14 may include the second non-contact heating unit 46. The second non-contact heating unit 46 is provided inside the housing 40. The second non-contact heating unit 46 is disposed facing the second contact heating unit 45. In particular, the second non-contact heating unit 46 is disposed facing the second contact heating surface 55. The second non-contact heating unit 46 is disposed with the transport path 22 sandwiched between the second non-contact heating unit 46 and the second contact heating unit 45.

The second non-contact heating unit 46, similar to the first non-contact heating unit 44, is configured to blow air to the printing surface of the medium M after printing in a state of not being in contact with the printing surface of the medium M after printing. Specifically, the second non-contact heating unit 46 may include a heater (not illustrated), a blower (not illustrated), and a plurality of air blowing ports (not illustrated). The plurality of air blowing ports (not illustrated) are provided at positions facing the transport path 22. The second non-contact heating unit 46 heats internal air by the heater. The second non-contact heating unit 46 blows the heated air from a plurality of blowing nozzles by driving of the blower. In this manner, the second non-contact heating unit 46 dries the medium M after printing by blowing air to the printing surface of the medium M after printing, without coming into contact with the printing surface of the medium M after printing.

In the second drying unit 42, the second contact heating unit 45 and the second non-contact heating unit 46 are provided separated by a predetermined distance. In the second drying unit 42, the second contact heating unit 45 and the second non-contact heating unit 46 are provided sandwiching the transport path 22. As the predetermined distance, a minimum distance is adopted to increase drying efficiency of the medium M, and to reduce a size of the drying unit 14. The predetermined distance may be, for example, about 15 mm.

In this manner, in the drying unit 14, the second non-contact heating unit 46, the second contact heating unit 45, the first contact heating unit 43, and the first non-contact heating unit 44 are disposed in order from the upper Z1 side in the vertical direction Z. That is, the second non-contact heating unit 46, the second contact heating unit 45, the first contact heating unit 43, and the first non-contact heating unit 44 are provided at positions overlapping each other in the vertical direction Z. In other words, the first contact heating unit 43 is provided on the lower Z2 side in the vertical direction Z from the second contact heating unit 45.

Further, the first contact heating unit 43 is positioned upstream in the transport direction D from the second contact heating unit 45 and the second non-contact heating unit 46. The first non-contact heating unit 44 is positioned upstream in the transport direction D from the second contact heating unit 45 and the second non-contact heating unit 46. That is, the second contact heating unit 45 is provided downstream in the transport direction D from the first contact heating unit 43.

The drying unit 14 includes the first support portion 47. The first support portion 47 is provided inside the housing 40. The first support portion 47 is disposed on the first longitudinal direction Y1 side of the first contact heating unit 43 and the second contact heating unit 45. The first support portion 47 may be attached to the first side wall 40B. The first support portion 47 is configured to support the first contact heating unit 43 and the second contact heating unit 45 from the first longitudinal direction Y1 side.

The drying unit 14 includes the second support portion 48. The second support portion 48 is provided inside the housing 40. The second support portion 48 is disposed on the second longitudinal direction Y2 side of the first contact heating unit 43 and the second contact heating unit 45. The second support portion 48 may be attached to the second side wall 40C. The second support portion 48 is configured to support the first contact heating unit 43 and the second contact heating unit 45 from the second longitudinal direction Y2 side.

In this manner, the first support portion 47 is provided at one of positions sandwiching the first contact heating unit 43 and the second contact heating unit 45 in the transport direction D. The second support portion 48 is provided at another of the positions sandwiching the first contact heating unit 43 and the second contact heating unit 45 in the transport direction D. That is, the first support portion 47 and the second support portion 48 are a pair of the support portions provided at the positions sandwiching the first contact heating unit 43 and the second contact heating unit 45 in the transport direction D.

Configuration of Transport Unit 12

The transport unit 12 includes a first roller 23, and a second roller 24. The first roller 23 is a roller for transporting the medium M after printing from the outside of the first drying unit 41 to the inside of the first drying unit 41. The second roller 24 is a roller for transporting the medium M after printing from the inside of the second drying unit 42 to the outside of the second drying unit 42.

The first roller 23 and the second roller 24 may be driven rollers that corotate by friction of the medium M after printing to rotate. The first roller 23 and the second roller 24 may each be a driving roller that rotates by driving of a drive source, or may be a pair of rollers including a driven roller and a driving roller.

The transport unit 12 includes a folding unit 25. The folding unit 25 is provided downstream in the transport direction D from the first contact heating unit 43, and is provided upstream in the transport direction D from the second contact heating unit 45. The folding unit 25 is configured to transport the medium M after printing transported to the outside of the first drying unit 41 to the inside of the second drying unit 42. That is, the folding unit 25 is configured to fold back the medium M after printing that came into contact with the first contact heating surface 51 to the second contact heating surface 55. In other words, the folding unit 25 transports the medium M after printing transported toward the second longitudinal direction Y2 so as to fold the same back toward the first longitudinal direction Y1.

The folding unit 25 may include a first folding roller 26, and a second folding roller 27. The first folding roller 26 is a roller for transporting the medium M after printing transported to the outside of the first drying unit 41 to the second folding roller 27. The second folding roller 27 is a roller for transporting the medium M after printing transported by the first folding roller 26 to the inside of the second drying unit 42.

The first folding roller 26 and the second folding roller 27 may be driven rollers that corotate by friction of the medium M after printing to rotate. The first folding roller 26 and the second folding roller 27 may each be a driving roller that rotates by driving of a drive source, or may be a pair of rollers including a driven roller and a driving roller.

The first roller 23 is disposed so as to transport the medium M after printing on the upper Z1 side of the supply port 40D in the vertical direction Z. The first folding roller 26 is disposed so as to transport the medium M after printing on the upper Z1 side of the first communication port 40F in the vertical direction Z. That is, the first roller 23 and the first folding roller 26 are disposed at positions for bringing the back surface of the medium M after printing in the first drying unit 41 into contact with the first contact heating surface 51. As a result, in the first drying unit 41, the medium M after printing is brought into a state where the back surface is pressed against the first contact heating surface 51, and tension is applied in the transport direction D. In this manner, the first roller 23 and the first folding roller 26 are disposed at positions for bringing the medium M after printing in the first drying unit 41 into contact with the first contact heating unit 43, and not bringing the medium M after printing in the first drying unit 41 into contact with the first non-contact heating unit 44.

The second roller 24 is disposed such that a bottom end portion of the roller transports the medium M after printing on the lower Z2 side in the vertical direction Z of the discharge port 40E. The second folding roller 27 is disposed so as to transport the medium M after printing on the lower Z2 side of the second communication port 40G in the vertical direction Z. That is, the second roller 24 and the second folding roller 27 are disposed at positions for bringing the medium M after printing in the second drying unit 42 into contact with the second contact heating surface 55. As a result, in the second drying unit 42, the medium M after printing is brought into a state where the back surface is pressed against the second contact heating surface 55, and tension is applied in the transport direction D. In this manner, the second roller 24 and the second folding roller 27 are disposed at positions for bringing the medium M after printing in the second drying unit 42 into contact with the second contact heating unit 45, and not bringing the medium M after printing in the second drying unit 42 into contact with the second non-contact heating unit 46.

In the present exemplary embodiment, the folding unit 25 and the second side wall 40C are provided inside the housing 40, but the present disclosure is not limited thereto. For example, the second side wall 40C may be an outermost covering of the housing 40, and the folding unit 25 may be provided outside the housing 40. The first roller 23 and the second roller 24 are provided outside the housing 40, but are not limited thereto. For example, the first side wall 40B need not be an outermost covering of the housing 40, and at least one of the first roller 23 or the second roller 24 may be provided inside the housing 40. The housing 40 may include an air inlet (not illustrated) for incorporating outside air therein, and an exhaust port (not illustrated) for exhausting internal air to the outside.

Configuration of First Support Portion 47

Figure 3:
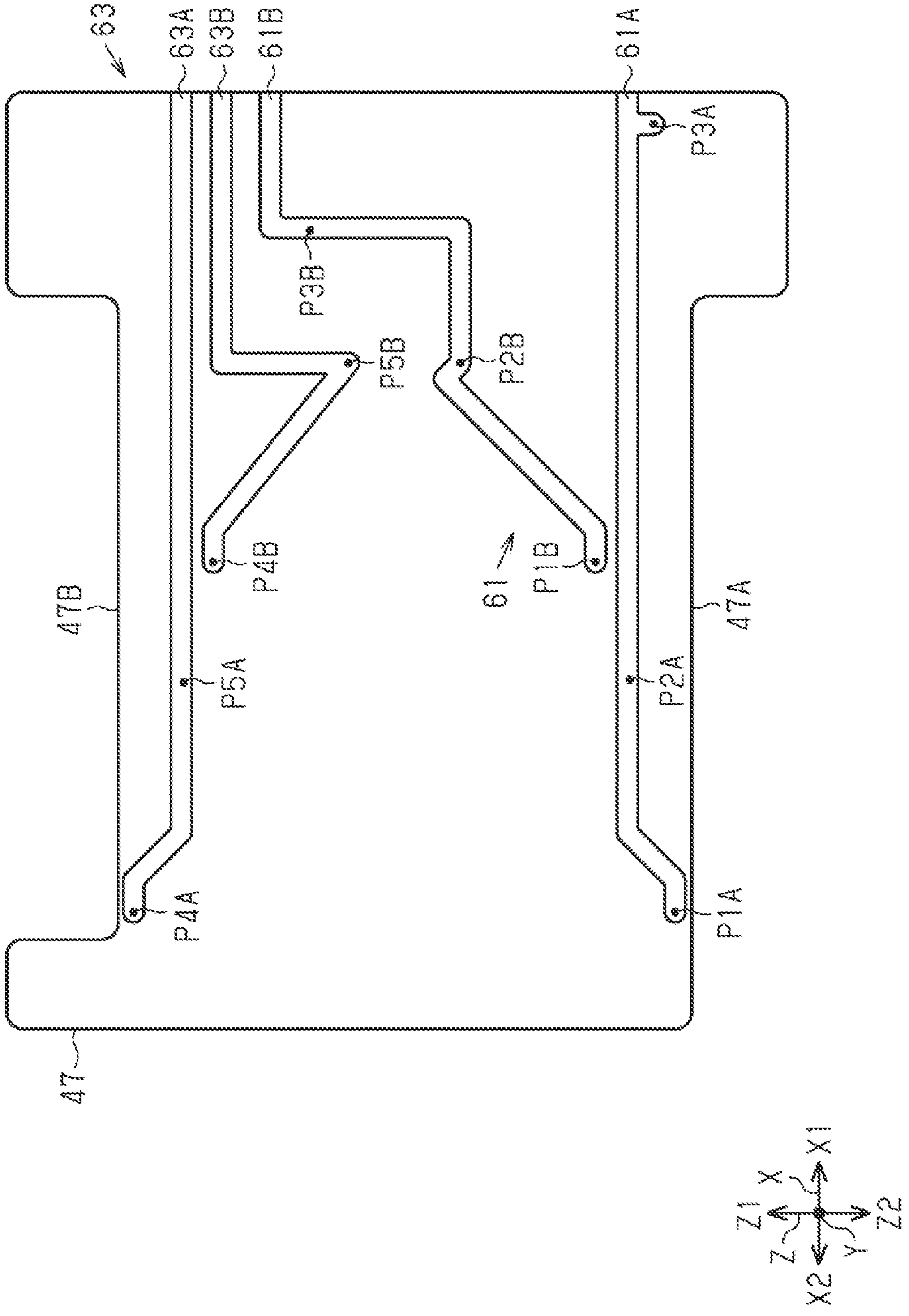
FIG. 3 is a side view illustrating a first support portion viewed from a second longitudinal direction.

As illustrated in FIG. 3, the first support portion 47 may include notches 47A and 47B. The notch 47A is provided on the lower Z2 side in the vertical direction Z of the first support portion 47. The notch 47B is provided on the upper Z1 side in the vertical direction Z of the first support portion 47. The notches 47A and 47B are formed for transporting the medium M after printing.

The first support portion 47 includes a first guide portion 61 and a third guide portion 63. The first support portion 47 is provided at a position toward the second longitudinal direction Y2 side of the first contact heating unit 43. The first guide portion 61 is provided at a position facing a surface where the first engagement portion 53 of the first contact heating unit 43 is formed. The first guide portion 61 can engage with the first engagement portion 53 of the first contact heating unit 43. The first guide portion 61 may be configured with a plurality of groove portions 61A and 61B formed at an XZ plane of the first support portion 47. The XZ plane is a plane including the width direction X and the vertical direction Z.

The first guide portion 61 includes positions PIA and P1B that engage with the first engagement portion 53 when the first contact heating unit 43 is in first posture. The first guide portion 61 includes positions P2A and P2B that engage with the first engagement portion 53 when the first contact heating unit 43 is in second posture. The first guide portion 61 includes positions P3A and P3B that engage with the first engagement portion 53 when the first contact heating unit 43 is in third posture.

The third guide portion 63 is provided at a position facing a surface where the third engagement portion 57 of the second contact heating unit 45 is formed. The third guide portion 63 can engage with the third engagement portion 57 of the second contact heating unit 45. The third guide portion 63 may be configured with a plurality of groove portions 63A and 63B formed at the XZ plane of the first support portion 47.

The third guide portion 63 includes positions P4A and P4B that engage with the third engagement portion 57 when the second contact heating unit 45 is in fourth posture. The third guide portion 63 includes positions P5A and P5B that engage with the third engagement portion 57 when the second contact heating unit 45 is in fifth posture.

Configuration of Second Support Portion 48

Figure 4:
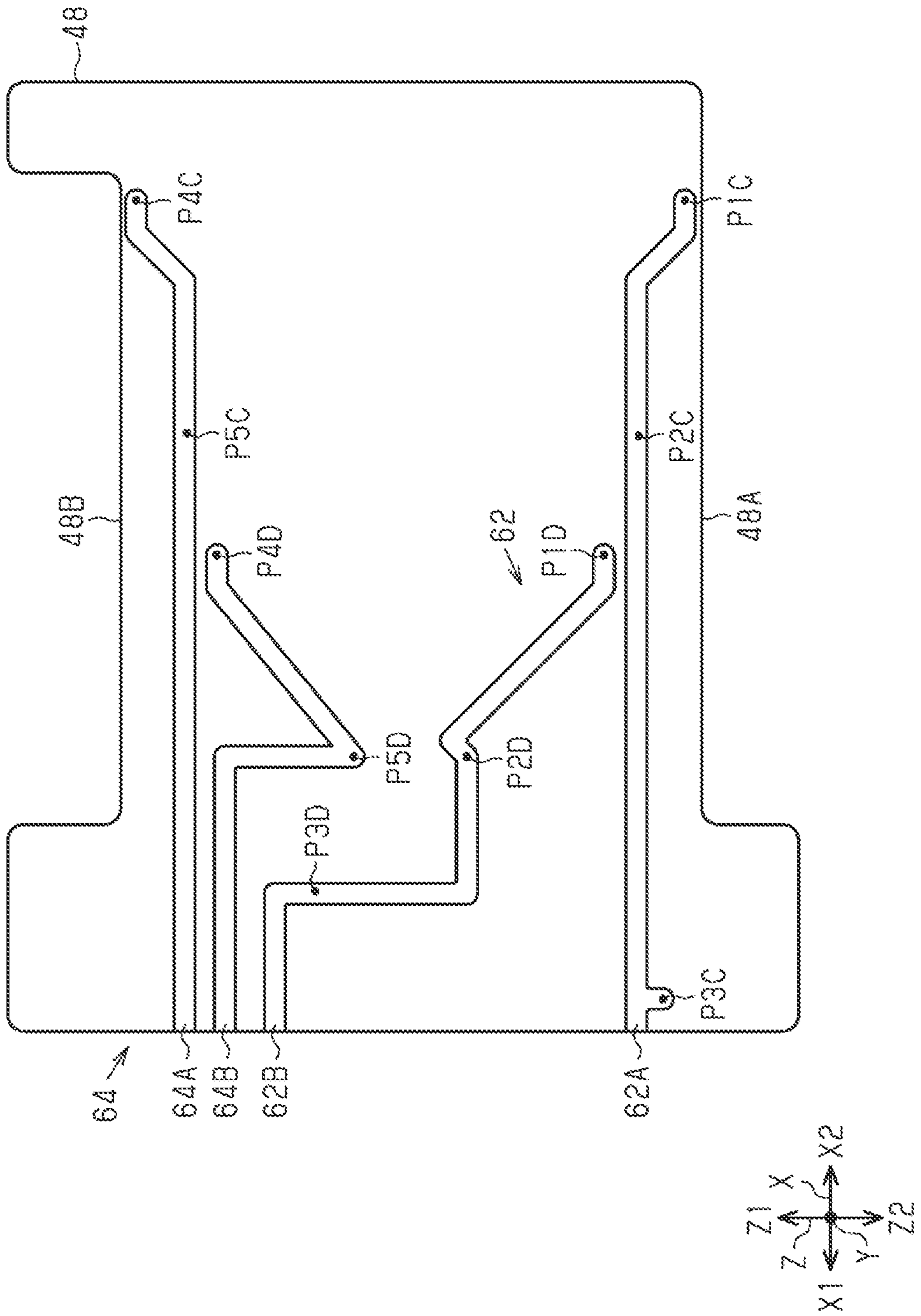
FIG. 4 is a side view illustrating a second support portion viewed from a first longitudinal direction.

As illustrated in FIG. 4, the second support portion 48 may include notches 48A and 48B. The notch 48A is provided on the lower Z2 side in the vertical direction Z of the second support portion 48. The notch 48B is provided on the upper Z1 side in the vertical direction Z of the second support portion 48. The notches 48A and 48B are formed for transporting the medium M after printing.

The second support portion 48 includes a second guide portion 62 and a fourth guide portion 64. The second support portion 48 is provided at a position toward the first longitudinal direction Y1 side of the first contact heating unit 43. The second guide portion 62 is provided at a position facing a surface where the second engagement portion 54 of the first contact heating unit 43 is formed. The second guide portion 62 can engage with the second engagement portion 54 of the first contact heating unit 43. The second guide portion 62 may be configured with a plurality of groove portions 62A and 62B formed at the XZ plane of the second support portion 48.

The second guide portion 62 includes positions P1C and P1D that engage with the second engagement portion 54 when the first contact heating unit 43 is in the first posture. The second guide portion 62 includes positions P2C and P2D that engage with the second engagement portion 54 when the first contact heating unit 43 is in the second posture. The second guide portion 62 includes positions P3C and P3D that engage with the second engagement portion 54 when the first contact heating unit 43 is in the third posture.

The fourth guide portion 64 is provided at a position facing a surface where the second engagement portion 54 of the second contact heating unit 45 is formed. The fourth guide portion 64 can engage with the fourth engagement portion 58 of the second contact heating unit 45. The fourth guide portion 64 may be configured with a plurality of groove portions 64A and 64B formed at the XZ plane of the second support portion 48.

The fourth guide portion 64 includes positions P4C and P4D that engage with the fourth engagement portion 58 when the second contact heating unit 45 is in the fourth posture. The fourth guide portion 64 includes positions P5C and P5D that engage with the fourth engagement portion 58 when the second contact heating unit 45 is in the fifth posture.

Configuration of First Contact Heating Unit 43 and Second Contact Heating Unit 45

Figure 5:
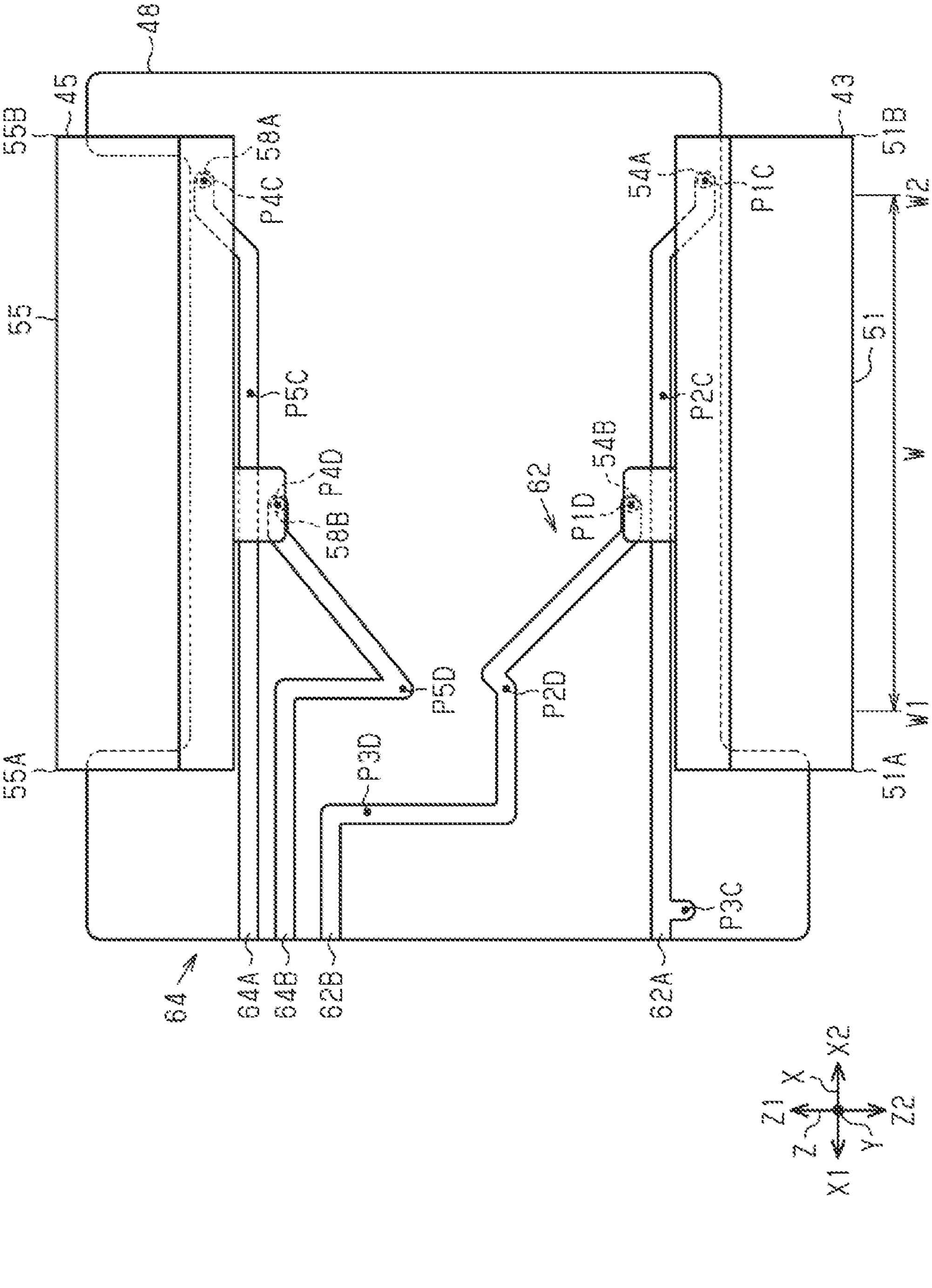
FIG. 5 is a side view illustrating a drying unit viewed from the first longitudinal direction.
Figure 6:
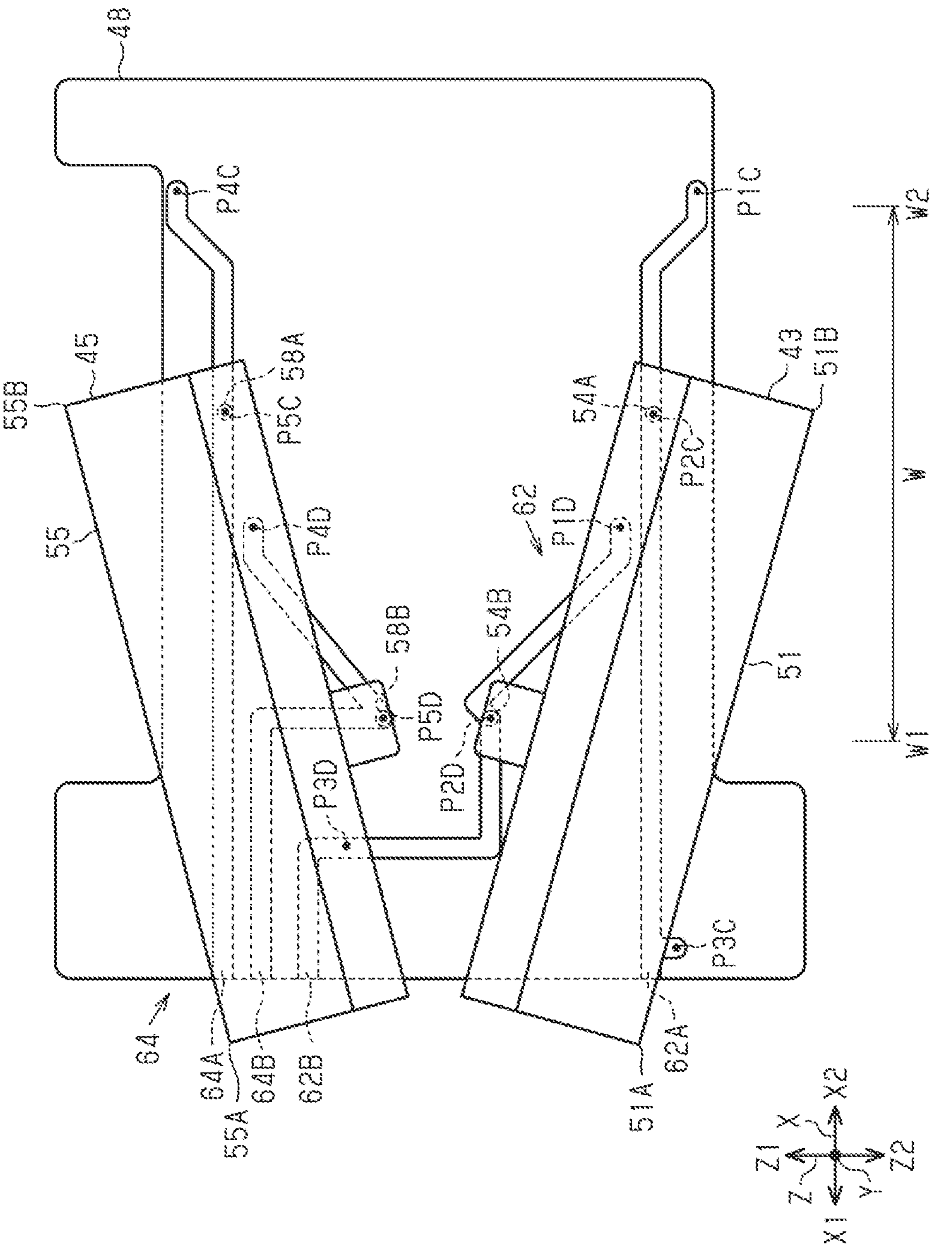
FIG. 6 is a side view illustrating the drying unit viewed from the first longitudinal direction.
Figure 7:
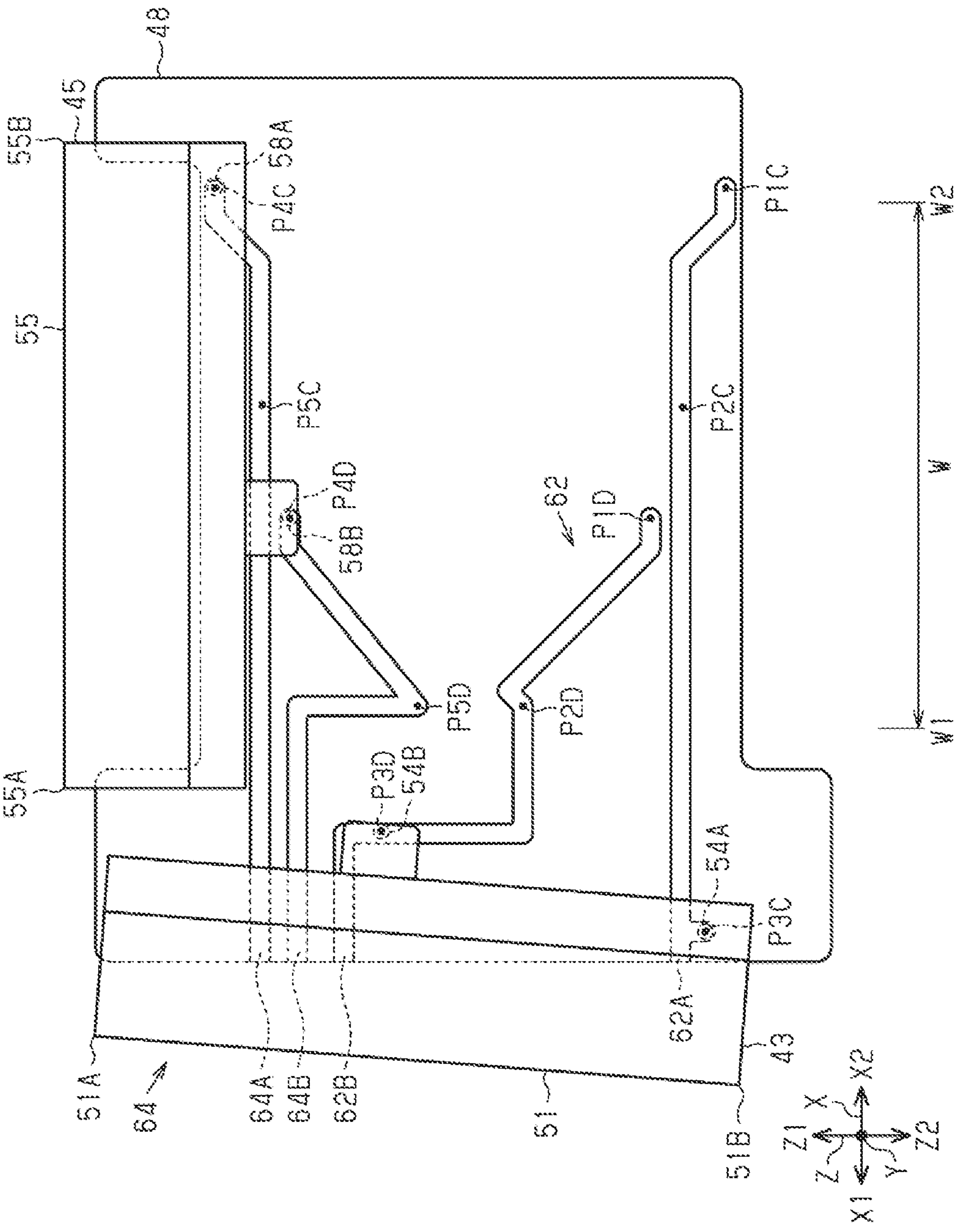
FIG. 7 is a side view illustrating the drying unit viewed from the first longitudinal direction.

As illustrated in FIGS. 5 to 7, the first contact heating unit 43 may include a plurality of cam followers 54A and 54B. The cam follower 54A engages with the groove portion 62A. The cam follower 54B engages with the groove portion 62B. This allows the cam follower 54A to smoothly slide through the groove 62A and the cam follower 54B to smoothly slide through the groove portion 62B.

The first contact heating unit 43 may include a plurality of cam followers (not illustrated), similarly to the plurality of cam followers 54A and 54B. A first cam follower engages with the groove portion 61A. A second cam follower engages with the groove portion 61B. This allows the first cam follower to smoothly slide through the groove portion 61A, and the second cam follower to smoothly slide through the groove portion 61B.

In this manner, the first contact heating unit 43 is movable along the first guide portion 61 and the second guide portion 62, in a state where the first engagement portion 53 engages with the first guide portion 61, and the second engagement portion 54 engages with the second guide portion 62. Accordingly, the first contact heating unit 43 can change the posture.

The second contact heating unit 45 may include a plurality of cam followers 58A and 58B. The cam follower 58A engages with the groove portion 64A. The cam follower 58B engages with the groove portion 64B. This allows the cam follower 58A to smoothly slide through the groove portion 64A and the cam follower 58B to smoothly slide through the groove portion 64B.

The second contact heating unit 45 may include a plurality of cam followers (not illustrated), similarly to the plurality of cam followers 58A and 58B. A first cam follower engages with the groove portion 63A. A second cam follower engages with the groove portion 63B. This allows the first cam follower to smoothly slide through the groove portion 63A, and the second cam follower to smoothly slide through the groove portion 63B.

In this manner, the second contact heating unit 45 is movable along the third guide portion 63 and the fourth guide portion 64, in a state where the third engagement portion 57 engages with the third guide portion 63, and the fourth engagement portion 58 engages with the fourth guide portion 64. Accordingly, the second contact heating unit 45 can change the posture.

As illustrated in FIG. 5, the first contact heating unit 43 is disposed at a first position during normal drying of the medium M after printing. The first contact heating unit 43 is in the first posture by being disposed at the first position. The first position is a position where the first contact heating surface 51 faces the downside Z2 in the vertical direction Z. The first position is a position where the first contact heating surface 51 is disposed straddling both a first end portion W1 and a second end portion W2 of the medium M after printing. That is, the first position is a position where the first contact heating surface 51 faces the back surface of the medium M after printing. In the figure, a length in the width direction X of the medium M after printing is denoted as a width W, and an end portion in the first width direction X1 of the medium M is denoted as the first end portion W1, and an end portion in the second width direction X2 is denoted as the second end portion W2.

When the first contact heating unit 43 is disposed at the first position, the first engagement portion 53 engages with the first guide portion 61, and the second engagement portion 54 engages with the second guide portion 62. In a specific example, when the first contact heating unit 43 is disposed at the first position, the cam follower 54A engages with the groove portion 62A at the position P1C. When the first contact heating unit 43 is disposed at the first position, the cam follower 54B engages with the groove portion 62B at the position P1D.

In this manner, the first contact heating unit 43 is in the first posture by being disposed at the first position, in the state where the first engagement portion 53 engages with the first guide portion 61, and the second engagement portion 54 engages with the second guide portion 62.

Further, the second contact heating unit 45 is disposed at a fourth position during the normal drying of the medium M after printing. The second contact heating unit 45 is in the fourth posture by being disposed at the fourth position. The fourth position is a position where the second contact heating surface 55 faces the upside Z1 in the vertical direction Z. The fourth position is a position where the second contact heating surface 55 is disposed straddling both the first end portion W1 and the second end portion W2 of the medium M after printing. That is, the fourth position is a position where the second contact heating surface 55 faces the back surface of the medium M after printing.

In the second contact heating unit 45, the third engagement portion 57 engages with the third guide portion 63, and the fourth engagement portion 58 engages with the fourth guide portion 64. In a specific example, when the second contact heating unit 45 is disposed at the fourth position, the cam follower 58A engages with the groove portion 64A at the position P4C. When the second contact heating unit 45 is disposed at the fourth position, the cam follower 58B engages with the groove portion 64B at the position P4D.

In this manner, the second contact heating unit 45 is in the fourth posture by being disposed at the fourth position, in the state where the third engagement portion 57 engages with the third guide portion 63, and the fourth engagement portion 58 engages with the fourth guide portion 64.

As illustrated in FIG. 6, the first contact heating unit 43 is disposed at a second position during installation and during maintenance of the medium M. The first contact heating unit 43 is in the second posture by being disposed at the second position.

The second position is a position, different from the first position, where the first contact heating surface 51 is moved to the first width direction X1 side as compared to the first position. The first width direction X1 is also a direction intersecting the transport direction D. The first width direction X1 side is also a side on which the swing door 40A is provided. The second position is a position where the first contact heating surface 51 is disposed straddling the first end portion W1 of the medium M after printing, but not straddling the second end portion W2. In this way, it can also be said that the second position is a position where the first contact heating surface 51 does not face the back surface of the medium M after printing. In other words, the second position is, with respect to an XY plane of the medium M, a position where an XY plane of the first contact heating surface 51 is inclined, and is a position where the XY plane of the first contact heating surface 51 is not parallel. The XY plane is a plane including the width direction X and the longitudinal direction Y.

The second position is a position where the first contact heating surface 51 is more separated from the first non-contact heating unit 44 as compared to the first position. Specifically, the second position is a position where a first end portion 51A on the first width direction X1 side of the first contact heating surface 51 is more separated from the first non-contact heating unit 44 as compared to the first position. The second position is a position where a second end portion 51B on the second width direction X2 side of the first contact heating surface 51 is more separated from the first non-contact heating unit 44 as compared to the first position.

The second position is a position where the first contact heating surface 51 is inclined so as to face the first width direction X1 side. In particular, the second position may be a position where the first contact heating surface 51 is inclined at an angle of less than 90 degrees as compared to the first position. That is, the second position is a position where the first contact heating surface 51 faces a direction closer to the downside Z2 in the vertical direction Z as compared to a position where the first contact heating surface 51 faces the first width direction X1, and is a position where the first contact heating surface 51 faces a direction closer to the first width direction X1 as compared to a position where the first contact heating surface 51 faces the downside Z2 in the vertical direction Z. In other words, the second position is, with the first position as a reference, a position facing a direction closer to the downside Z2 in the vertical direction Z, as compared to a position where an inclination angle of the first contact heating surface 51 is 90 degrees. Additionally, the second position is, with the first position as a reference, a position facing a direction closer to the first width direction X1, as compared to a position where the inclination angle of the first contact heating surface 51 is 0 degrees. The second position is a position where the first end portion 51A of the first contact heating surface 51 is more separated from the first non-contact heating unit 44, as compared to the second end portion 51B of the first contact heating surface 51.

When the first contact heating unit 43 is disposed at the second position, the first engagement portion 53 engages with the first guide portion 61, and the second engagement portion 54 engages with the second guide portion 62. In a specific example, when the first contact heating unit 43 is disposed at the second position, the cam follower 54A engages with the groove portion 62A at the position P2C. When the first contact heating unit 43 is disposed at the second position, the cam follower 54B engages with the groove portion 62B at the position P2D.

In this way, the first contact heating unit 43 can change the posture from the first posture to the second posture, by the movement from the first position to the second position, in the state where the first engagement portion 53 engages with the first guide portion 61, and the second engagement portion 54 engages with the second guide portion 62. That is, by the first contact heating unit 43 being in the second posture, workability during installation and during maintenance of the medium M is improved.

The second contact heating unit 45 is disposed at a fifth position during installation and during maintenance of the medium M. The second contact heating unit 45 is in the fifth posture by being disposed at the fifth position. The second contact heating unit 45 cannot be disposed at the fifth position when the first contact heating unit 43 is disposed at a third position described later, but is not limited thereto, and, for example, may be disposed at the fifth position when the first contact heating unit 43 is disposed at the third position described later.

The fifth position is a position, different from the fourth position, where the second contact heating surface 55 is moved to the first width direction X1 side as compared to the fourth position. The fifth position is a position where the second contact heating surface 55 is disposed straddling the first end portion W1 of the medium M after printing, but not straddling the second end portion W2. In this way, it can also be said that the fifth position is a position where the second contact heating surface 55 does not face the back surface of the medium M after printing.

The fifth position is a position where the second contact heating surface 55 is more separated from the second non-contact heating unit 46 as compared to the fourth position. Specifically, the fifth position is a position where a first end portion 55A on the first width direction X1 side of the second contact heating surface 55 is more separated from the second non-contact heating unit 46 as compared to the fourth position. The fifth position is a position where a second end portion 55B on the second width direction X2 side of the second contact heating surface 55 is more separated from the second non-contact heating unit 46 as compared to the fourth position.

The fifth position is a position where the second contact heating surface 55 is inclined so as to face the first width direction X1 side. In particular, the fifth position may be a position where the second contact heating surface 55 is inclined at an angle of less than 90 degrees as compared to the fourth position. That is, the fifth position is a position where the second contact heating surface 55 faces a direction closer to the upside Z1 in the vertical direction Z as compared to a position where the second contact heating surface 55 faces the first width direction X1, and is a position where the second contact heating surface 55 faces a direction closer to the first width direction X1 as compared to a position where the second contact heating surface 55 faces the upside Z1 in the vertical direction Z. In other words, the fifth position is, with the fourth position as a reference, a position facing a direction closer to the upside Z1 in the vertical direction Z, as compared to a position where an inclination angle of the second contact heating surface 55 is 90 degrees. Additionally, the fifth position is, with the fourth position as a reference, a position facing a direction closer to the first width direction X1, as compared to a position where the inclination angle of the second contact heating surface 55 is 0 degrees. The fifth position is a position where the first end portion 55A of the second contact heating surface 55 is more separated from the second non-contact heating unit 46, as compared to the second end portion 55B of the second contact heating surface 55.

In the second contact heating unit 45, the third engagement portion 57 engages with the third guide portion 63, and the fourth engagement portion 58 engages with the fourth guide portion 64. In a specific example, when the second contact heating unit 45 is disposed at the fifth position, the cam follower 58A engages with the groove portion 64A at the position P5C. When the second contact heating unit 45 is disposed at the fifth position, the cam follower 58B engages with the groove portion 64B at the position PSD.

In this way, the second contact heating unit 45 can change the posture from the fourth posture to the fifth posture, by the movement from the fourth position to the fifth position, in the state where the third engagement portion 57 engages with the third guide portion 63, and the fourth engagement portion 58 engages with the fourth guide portion 64. That is, by the second contact heating unit 45 being in the fifth posture, the workability during installation and during maintenance of the medium M is improved.

As illustrated in FIG. 7, the first contact heating unit 43 can also be disposed at the third position during maintenance. The first contact heating unit 43 is in the third posture by being disposed at the third position. When the first contact heating unit 43 is disposed at the third position, the second contact heating unit 45 is disposed at the fourth position.

The third position is a position, different from the first position and the second position, where the first contact heating surface 51 is moved to the first width direction X1 side as compared to the second position. The third position is a position where the first contact heating surface 51 is disposed not straddling both the first end portion W1 and the second end portion W2 of the medium M after printing. In this way, it can also be said that the third position is a position where the first contact heating surface 51 does not face the back surface of the medium M after printing.

The third position is a position where the first contact heating surface 51 is more separated from the first non-contact heating unit 44 as compared to the first position and the second position. Specifically, the third position is a position where the first end portion 51A of the first contact heating surface 51 is more separated from the first non-contact heating unit 44 as compared to the first position and the second position. The third position is a position where the second end portion 51B of the first contact heating surface 51 is more separated from the first non-contact heating unit 44 as compared to the first position and the second position. The third position is a position where the first end portion 51A of the first contact heating surface 51 is more separated from the first non-contact heating unit 44, as compared to the second end portion 51B of the first contact heating surface 51. Thus, the third position is a position more separated from the first position as compared to the second position.

The third position is a position where the first contact heating surface 51 is inclined so as to face the first width direction X1 side. In particular, the third position may be a position where the first contact heating surface 51 is inclined at an angle of 90 degrees or greater as compared to the first position. In other words, the third position is a position where the first contact heating surface 51 faces the first width direction X1, or a position where the first contact heating surface 51 faces a direction closer to the upside Z1 in the vertical direction Z as compared to the first width direction X1. In other words, the third position is a position where the inclination angle of the first contact heating surface 51 is 90 degrees with the first position as a reference, or is a position facing a direction closer to the upside Z1 in the vertical direction Z as compared to a position where the inclination angle of the first contact heating surface 51 is 90 degrees. The third position is a position where the first end portion 51A of the first contact heating surface 51 is more separated from the first non-contact heating unit 44, as compared to the second end portion 51B of the first contact heating surface 51.

When the first contact heating unit 43 is disposed at the third position, the first engagement portion 53 engages with the first guide portion 61, and the second engagement portion 54 engages with the second guide portion 62. In a specific example, when the first contact heating unit 43 is disposed at the third position, the cam follower 54A engages with the groove portion 62A at the position P3C. When the first contact heating unit 43 is disposed at the third position, the cam follower 54B engages with the groove portion 62B at the position P3D.

In this way, the first contact heating unit 43 can change the posture from the second posture to the third posture, by the movement from the second position to the third position, in the state where the first engagement portion 53 engages with the first guide portion 61, and the second engagement portion 54 engages with the second guide portion 62. In other words, the first contact heating unit 43 can change the posture from the first posture to the third posture, by the movement from the first position to the third position, in the state where the first engagement portion 53 engages with the first guide portion 61, and the second engagement portion 54 engages with the second guide portion 62. In this way, compared to when the first contact heating unit 43 is in the second posture, the first contact heating unit 43 is in the third position, and thus the workability during installation and during maintenance of the medium M is improved.

Operations of First Exemplary Embodiment

Operations of the first exemplary embodiment will be described.

In the printing apparatus 10, when a printing instruction is input, the medium M is transported along the transport path 22 by the transport unit 12. The medium M transported along the transport path 22 is supported by the support portion 11 in the printing area PA. Printing is performed by the printing unit 13 on the medium M supported by the support portion 11. The medium M after printing is transported to the drying unit 14. The medium M after printing transported to the drying unit 14 is dried by the drying unit 14.

Specifically, in the first drying unit 41, the medium M after printing is transported so that the back surface of the medium M after printing comes into contact with the first contact heating surface 51, and the printing surface of the medium M after printing does not come into contact with the first non-contact heating unit 44 while facing the first non-contact heating unit 44. In particular, the medium M after printing is disposed such that the back surface of the medium M after printing is pressed against the curved first contact heating surface 51. Thus, the medium M after printing is dried by the first contact heating unit 43 and the first non-contact heating unit 44. The medium M after printing dried by the first drying unit 41 is transported from the first drying unit 41 to the second drying unit 42 by the folding unit 25.

In the second drying unit 42, the medium M after printing is transported so that the back surface of the medium M after printing comes into contact with the second contact heating surface 55, and the printing surface of the medium M after printing does not come into contact with the second non-contact heating unit 46 while facing the second non-contact heating unit 46. In particular, the medium M after printing is disposed such that the back surface of the medium M after printing is pressed against the curved second contact heating surface 55. Thus, the medium M after printing is dried by the second contact heating unit 45 and the second non-contact heating unit 46.

The first contact heating unit 43 is in the first posture by being disposed at the first position during the normal drying of the medium M after printing. The first contact heating unit 43 is disposed so that the first contact heating surface 51 faces the back surface of the medium M after printing at the first position. The first contact heating unit 43 is disposed such that the first contact heating surface 51 faces the first non-contact heating unit 44 with the medium M after printing interposed therebetween, at the first position.

The first contact heating unit 43 is disposed such that a distance from the first non-contact heating unit 44 is short in order to improve drying efficiency, at the first position. Therefore, when the first contact heating unit 43 is disposed at the first position, workability of work associated with the first contact heating unit 43 is reduced.

For example, when the medium M is installed between the first contact heating unit 43 and the first non-contact heating unit 44 in the first drying unit 41, the workability is reduced when the first contact heating unit 43 is disposed at the first position. Further, for example, also when maintenance such as cleaning of a surface of the first contact heating surface 51 is performed in the first drying unit 41, the workability is reduced when the first contact heating unit 43 is disposed at the first position.

The second contact heating unit 45 is in the fourth posture by being disposed at the fourth position during the normal drying of the medium M after printing. The second contact heating unit 45 is disposed so that the second contact heating surface 55 faces the back surface of the medium M after printing at the fourth position. The second contact heating unit 45 is disposed such that the second contact heating surface 55 faces the second non-contact heating unit 46 with the medium M after printing interposed therebetween, at the fourth position.

The second contact heating unit 45 is disposed such that a distance from the second non-contact heating unit 46 is short in order to improve the drying efficiency, at the fourth position. Therefore, when the second contact heating unit 45 is disposed at the fourth position, while the drying efficiency is improved, workability of work associated with the second contact heating unit 45 is reduced in the same manner as the first contact heating unit 43.

The first contact heating unit 43 is in the second posture by being disposed at the second position from the first position, during installation and during maintenance of the medium M. At the second position, the first contact heating unit 43 is disposed such that the first contact heating surface 51 is more separated from the back surface of the medium M after printing as compared to the first position. This makes it possible to suppress a decrease in the workability of work associated with the first contact heating unit 43.

In particular, the first contact heating unit 43 is in the third posture by being disposed at the third position from the second position, during installation and during maintenance of the medium M. At the third position, the first contact heating unit 43 is disposed such that the first contact heating surface 51 is more separated from the back surface of the medium M after printing as compared to the second position. At the third position, the first contact heating unit 43 is disposed such that the first contact heating surface 51 is more separated from the first non-contact heating unit 44 as compared to the second position. At the third position, the first contact heating unit 43 is disposed such that the first contact heating surface 51 faces the first width direction X1, or such that the first contact heating surface 51 faces a direction closer to the upside Z1 in the vertical direction Z as compared to a position where the first contact heating surface 51 faces the first width direction X1. This makes it possible to suppress a decrease in the workability of work associated with the first contact heating unit 43.

Further, the second contact heating unit 45 is in the fifth posture by being disposed at the fifth position from the fourth position, during installation and during maintenance of the medium M. At the fifth position, the second contact heating unit 45 is disposed such that the second contact heating surface 55 is more separated from the back surface of the medium M after printing as compared to the fourth position. At the fifth position, the second contact heating unit 45 is disposed such that the second contact heating surface 55 faces a direction closer to the first width direction X1, as compared to a position where the second contact heating surface 55 faces the upside Z1 in the vertical direction Z. This makes it possible to suppress a decrease in the workability of work associated with the second contact heating unit 45.

Further, when the first contact heating unit 43 is disposed at the second position and the third position, maintenance of the first contact heating unit 43 can be performed while the medium M is disposed. When the second contact heating unit 45 is disposed at the fifth position, maintenance of the second contact heating unit 45 can be performed while the medium M is disposed.

As an example of the maintenance, it is possible to remove dirt adhering to the first contact heating surface 51 and the second contact heating surface 55. In particular, when a label sheet is adopted as an example of the medium M, even when an adhesive adheres to the first contact heating surface 51 and the second contact heating surface 55, the adhesive of the label sheet can be removed.

Effects of First Exemplary Embodiment

Effects of the first exemplary embodiment will be described.

(1) The first contact heating unit 43 includes the first contact heating surface 51 configured to come into contact with the back surface of the medium M after printing, the first engagement portion 53 that can engage with the first guide portion 61 of the first support portion 47, and the second engagement portion 54 that can engage with the second guide portion 62 of the second support portion 48. The first contact heating unit 43 can change the posture from the first posture to the second posture by the movement from the first position to the second position, in the state where the first engagement portion 53 engages with the first guide portion 61, and the second engagement portion 54 engages with the second guide portion 62. The first position is the position where the first contact heating surface 51 faces the back surface of the medium M after printing, and the second position is the position where the first contact heating surface 51 is more separated from the back surface of the medium M after printing as compared to the first position. Thus, the first contact heating unit 43 can be changed from the first posture where the first contact heating surface 51 faces the back surface of the medium M after printing to the second posture where the first contact heating surface 51 is more separated from the back surface of the medium M after printing as compared to the first posture. This makes it possible to suppress a decrease in the workability of work associated with the first contact heating unit 43, even when space saving is attempted for the configuration of the drying unit 14.

(2) The second position is the position where the first contact heating surface 51 is moved to the first width direction X1 side in the width direction X intersecting the transport direction D as compared to the first position. Thus, the first contact heating surface 51 can be moved toward the first width direction X1 side by the movement of the first contact heating unit 43 from the first position to the second position. As a result, space saving can be achieved for the disposition of the drying unit 14, as compared to a configuration in which the first contact heating unit 43 is moved to the upper Z1 side in the vertical direction Z. Then, it is possible to suppress a decrease in the workability of work associated with the first contact heating unit 43, even when space saving is attempted for the disposition of the drying unit 14.

(3) The second position is the position where the first contact heating surface 51 is more inclined as compared to the first position. Thus, the first contact heating surface 51 can be made inclined, by the movement of the first contact heating unit 43 from the first position to the second position. As a result, space saving can be achieved for the disposition of the drying unit 14, as compared to a configuration in which the first contact heating unit 43 is moved to the upper Z1 side in the vertical direction Z. Then, it is possible to suppress a decrease in the workability of work associated with the first contact heating unit 43, even when space saving is attempted for the disposition of the drying unit 14.

(4) The first contact heating unit 43 can change the posture from the second posture to the third posture by the movement from the second position to the third position, in the state where the first engagement portion 53 engages with the first guide portion 61, and the second engagement portion 54 engages with the second guide portion 62. The third position is the position where the first contact heating surface 51 is more separated from the back surface of the medium M after printing, as compared to the second position. Thus, by moving the first contact heating unit 43 from the second position to the third position, it is possible move the first contact heating surface 51 to a position further separated from the back surface of the medium M after printing, as compared to the second position. This makes it possible to suppress a decrease in the workability of work associated with the first contact heating unit 43, even when space saving is attempted for the disposition of the drying unit 14.

(5) The first position is the position where the first contact heating surface 51 faces the downside Z2 in the vertical direction Z. The third position is the position where the first contact heating surface 51 is inclined toward the first width direction X1 at an angle of 90 degrees or greater as compared to the first position. Thus, by the movement of the first contact heating unit 43 from the first position to the third position, the first posture where the first contact heating unit 51 faces the downside Z2 in the vertical direction Z can be changed to the third posture where the first contact heating surface 51 faces the first width direction X1. This makes it possible to suppress a decrease in the workability of work associated with the first contact heating unit 43, even when space saving is attempted for the disposition of the drying unit 14.

(6) The drying unit 14 includes the first non-contact heating unit 44 facing the first contact heating surface 51 and configured to blow air to the printing surface of the medium M after printing in a state of not being in contact with the printing surface of the medium M after printing. Thus, the medium M after printing is dried from the back surface by the first contact heating unit 43, and is dried from the printing surface by the first non-contact heating unit 44. Thus, the drying efficiency of the medium M can be improved. Therefore, quality of the medium M after printing can be improved, in association with the drying of the medium M after printing. In addition to this, since the first non-contact heating unit 44 is positioned at the position facing the first contact heating surface 51, it is possible to suppress a decrease in the workability of work associated with the first contact heating unit 43, even when space saving for the configuration of the drying unit 14 is attempted.

(7) The drying unit 14 includes the second contact heating unit 45 provided inside the housing 40. The second contact heating unit 45 includes the second contact heating surface 55 facing the back surface of the medium M after printing and configured to come into contact with the back surface of the medium M after printing. The second contact heating surface 55 is disposed facing a direction opposite to the first contact heating surface 51. Thus, the medium M after printing is dried from the back surface by the first contact heating unit 43 and the second contact heating unit 45. Thus, the drying efficiency of the medium M can be improved. Therefore, quality of the medium M after printing can be improved, in association with the drying of the medium M after printing. In addition, by disposing the second contact heating surface 55 of the second contact heating unit 45 so as to face the direction opposite to the first contact heating surface 51, it is possible to suppress a decrease in the workability of work associated with the first contact heating unit 43 even when space saving is attempted for the configuration of the drying unit 14.

(8) The second contact heating unit 45 includes the third engagement portion 57 that can engage with the third guide portion 63 of the first support portion 47, and the fourth engagement portion 58 that can engage with the fourth guide portion 64 of the second support portion 48. The second contact heating unit 45 can change the posture from the fourth posture to the fifth posture by the movement from the fourth position to the fifth position, in the state where the third engagement portion 57 engages with the third guide portion 63, and the fourth engagement portion 58 engages with the fourth guide portion 64. The fourth position is the position where the second contact heating surface 55 faces the back surface of the medium M after printing, and the fifth position is the position where the second contact heating surface 55 is more separated from the back surface of the medium M after printing as compared to the fourth position. Thus, by the movement of the second contact heating unit 45 from the fourth position to the fifth position, the fourth posture where the second contact heating surface 55 faces the back surface of the medium M after printing can be changed to the fifth posture where the second contact heating surface 55 is more separated from the back surface of the medium M after printing as compared to the fourth posture. This makes it possible to suppress a decrease in the workability of work associated with the second contact heating unit 45 even when space saving is attempted for the configuration of the drying unit 14.

(9) In particular, in a state where the first contact heating unit 43 is disposed at the second position, and the second contact heating unit 45 is disposed at the fifth position, the medium M is brought into a state of being capable of being continuously disposed over the first drying unit 41 and the second drying unit 42. This makes it possible to suppress a decrease in the workability of work associated with the first contact heating unit 43 and the second contact heating unit 45, even when space saving is attempted for the configuration of the drying unit 14.

(10) The drying unit 14 includes the second non-contact heating unit 46 facing the second contact heating surface 55 and configured to blow air to the printing surface of the medium M after printing in a state of not being in contact with the printing surface of the medium M after printing. Thus, the medium M after printing is dried from the back surface by the first contact heating unit 43 and the second contact heating unit 45, and is dried from the printing surface by the second non-contact heating unit 46. Thus, the drying efficiency of the medium M can be improved. Therefore, quality of the medium M after printing can be improved, in association with the drying of the medium M after printing. In addition to this, since the second non-contact heating unit 46 is positioned at the position facing the second contact heating surface 55, it is possible to suppress a decrease in the workability of work associated with the second contact heating unit 45, even when space saving for the configuration of the drying unit 14 is attempted.

(11) The first contact heating surface 51 is curved to have the shape protruding in the direction opposite to the second contact heating surface 55, and the second contact heating surface 55 is curved to have the shape protruding in the direction opposite to the first contact heating surface 51. Thus, the medium M after printing can be brought into contact with the first contact heating surface 51 and the second contact heating surface 55 while being pressed. This makes it possible to use both the first contact heating unit 43 and the second contact heating unit 45, and increase the degree of close contact between the first contact heating surface 51 and the second contact heating surface 55 and the printing medium M, thereby improving the drying efficiency of the medium M after printing. Therefore, the quality of the medium M after printing can be improved, in association with the drying of the medium M after printing.

(12) The folding unit 25 is provided downstream in the transport direction D from the first contact heating unit 43, and is provided upstream in the transport direction D from the second contact heating unit 45. The folding unit 25 is configured to fold back the medium M after printing that came into contact with the first contact heating surface 51 to the second contact heating surface 55. The first contact heating surface 51 and the second contact heating surface 55 are surfaces facing the opposite directions. Thus, by using the folding unit 25, the first contact heating surface 51 and the second contact heating surface 55 can be disposed so as not to be adjacent to each other along the transport direction D. Thus, an increase in a size of the drying unit 14 in the transport direction D can be suppressed.

(13) The first contact heating surface 51 and the second contact heating surface 55 are the surfaces formed of the metal plate material. Therefore, the drying efficiency of the medium M can be improved by using the first contact heating surface 51 and the second contact heating surface 55 formed of the metal plate material having high thermal conductivity. Therefore, quality of the medium M after printing can be improved, in association with the drying of the medium M after printing.

(14) The first contact heating surface 51 and the second contact heating surface 55 are the surfaces subjected to the electroless plating. Thus, even when the degree of close contact between the first contact heating surface 51 and the second contact heating surface 55 and the medium M after printing is increased, friction force between the first contact heating surface 51 and the second contact heating surface 55 and the medium M after printing can be reduced. In this way, damage to the medium M after printing coming into contact with the first contact heating surface 51 and the second contact heating surface 55 can be suppressed. Additionally, in addition to this, even without providing a mechanism for separating the medium M after printing from the first contact heating surface 51 and the second contact heating surface 55, the medium M after printing coming into contact with the first contact heating surface 51 and the second contact heating surface 55 can be smoothly transported. Therefore, quality of the medium M after printing can be improved, in association with the drying of the medium M after printing.

Modified Examples

The embodiment described above may be modified as follows. The embodiment and modified examples thereof to be described below may be implemented in combination within a range in which a technical contradiction does not arise.

In the above-described exemplary embodiment, for example, each of the first contact heating surface 51 and the second contact heating surface 55 may be subjected to electroless plating different from the electroless Ni plating on a surface that comes into contact with the back surface of the medium M after printing. That is, each of the first contact heating surface 51 and the second contact heating surface 55 may be subjected to electroless plating on the surface that comes into contact with the back surface of the medium M after printing. This makes it possible to improve the quality of the medium M after printing in association with the drying of the medium M after printing.

In the above-described exemplary embodiment, for example, each of the first contact heating surface 51 and the second contact heating surface 55 may be subjected to a fluorine coating process on the surface that comes into contact with the back surface of the medium M after printing. This makes it possible to improve the quality of the medium M after printing in association with the drying of the medium M after printing.

In the above-described exemplary embodiment, for example, each of the first contact heating surface 51 and the second contact heating surface 55 may be subjected to an embossing process on the surface. This makes it possible to improve the quality of the medium M after printing in association with the drying of the medium M after printing.

In the above-described exemplary embodiment, for example, each of the first contact heating surface 51 and the second contact heating surface 55 may be further subjected to electroless plating on the surface subjected to the embossing process, or may further be subjected to the fluorine coating process on the surface subjected to the embossing process. This makes it possible to improve the quality of the medium M after printing in association with the drying of the medium M after printing.

In the above-described exemplary embodiment, for example, the first drying unit 41 and the second drying unit 42 may be disposed overlapping each other in a horizontal direction. That is, the first drying unit 41 and the second drying unit 42 may be disposed overlapping each other in the longitudinal direction Y. In such a case, for example, the vertical direction Z of FIG. 2 is the longitudinal direction Y, and the longitudinal direction Y of FIG. 2 is the vertical direction Z. Specifically, for example, the upside Z1 in the vertical direction Z of FIG. 2 is the second longitudinal direction Y2, the downside Z2 in the vertical direction Z of FIG. 2 is the first longitudinal direction Y1, the first longitudinal direction Y1 of FIG. 2 is the upside Z1 in the vertical direction Z, and the second longitudinal direction Y2 of FIG. 2 is the downside Z2 in the vertical direction Z. In this way, the first position may be a position where the first contact heating surface 51 faces the horizontal direction, and the fourth position may be a position where the second contact heating surface 55 faces the horizontal direction.

In the above-described exemplary embodiment, for example, at least one of the first non-contact heating unit 44 or the second non-contact heating unit 46 need not be provided. That is, the non-contact heating unit may be provided at least at one of the position facing the first contact heating surface 51 or the position facing the second contact heating surface 55, or need not be provided. Further, at least one of the first non-contact heating unit 44 or the second non-contact heating unit 46 corresponds to an example of the non-contact heating unit.

In the above-described embodiment, for example, with the first position as a reference, the third position may be a position where the first contact heating surface 51 is inclined at an angle of less than 90 degrees as compared to the first position as long as being inclined at a larger angle as compared to the second position.

In the above-described exemplary embodiment, for example, the first guide portion 61, the second guide portion 62, the third guide portion 63, and the fourth guide portion 64 may each have a convex shape, rather than a groove shape, as long as being capable of engaging with the first engagement portion 53, the second engagement portion 54, the third engagement portion 57, and the fourth engagement portion 58, respectively. In this case, the first engagement portion 53, the second engagement portion 54, the third engagement portion 57, and the fourth engagement portion 58 may each have a concave shape.

In the above-described exemplary embodiment, for example, the first contact heating unit 43 may be configured to be capable of being fixed at each of the first position, the second position, and the third position. The second contact heating unit 45 may be configured to be capable of being fixed at each of the fourth position and the fifth position.

In the above-described exemplary embodiment, for example, the first support portion 47 may be configured with a plurality of members. For example, the first support portion 47 may be divided into a member that supports the first contact heating unit 43, and a member that supports the second contact heating unit 45. For example, the second support portion 48 may be configured with a plurality of members. For example, the second support portion 48 may be divided into a member that supports the first contact heating unit 43, and a member that supports the second contact heating unit 45.

In the above-described exemplary embodiment, for example, the control unit 17 may adjust control contents by the drying unit 14. As a specific example, the control unit 17 may be capable of switching whether to drive each of the first contact heating unit 43, the first non-contact heating unit 44, the second contact heating unit 45, and the second non-contact heating unit 46 or not based on an instruction input by a user's operation. For example, the control unit 17 may be capable of adjusting a drying time for drying the medium M after printing, based on an instruction input by a user's operation. For example, the control unit 17 may be capable of setting a drying temperature serving as a reference for drying, based on an instruction input by a user's operation. For example, any drying temperature from 50 to 100 degrees may be settable.

In the above-described exemplary embodiment, the serial type printer is adopted as the printing apparatus 10, but the present disclosure is not limited thereto. For example, a lateral type printer or a line type printer may be adopted as the printing apparatus 10. The lateral type printer is a printer in which a carriage can move in two directions of a main scanning direction and a sub scanning direction. The line type printer is a printer including a plurality of nozzles arranged at a constant pitch in the width direction X, and capable of simultaneously discharging liquid over a width of the medium M.

The medium M is not limited to the medium fed from the roll body R. The medium M may be paper, resin film or sheet, resin-metal composite film, laminated film, woven fabric, non-woven fabric, metal foil, metal film, ceramic sheet, or the like. Further, the medium M may also be a towel, or a clothing such as a shirt.

The printing apparatus 10 is not limited to the printer, or may be a multifunction device including a scanner mechanism and a copy function in addition to the printing function.

The phrase "at least one" used herein means one or more of desired options. By way of example, the expression "at least one" used herein means only one option or both two options when the number of options is two. As another example, the expression "at least one" used herein means one option alone or a combination of two or more optional options when the number of options is three or more.

Supplementary Note

Hereinafter, technical concepts and effects thereof that are understood from the above-described embodiments and modified examples will be described.

(A) A printing apparatus includes a transport unit configured to transport a medium in a transport direction, a printing unit configured to perform printing on the medium by discharging liquid onto the medium transported by the transport unit, and a drying unit configured to dry the medium after printing on which printing was performed by the printing unit, wherein the drying unit includes a housing, a first contact heating unit provided inside the housing, a first support portion provided inside the housing and provided at one of positions sandwiching the first contact heating unit in the transport direction, and a second support portion provided inside the housing and provided at another of the positions sandwiching the first contact heating unit in the transport direction, the first support portion and the second support portion are configured to support the first contact heating unit, the first support portion includes a first guide portion provided at a position facing the first contact heating unit, the second support portion includes a second guide portion provided at a position facing the first contact heating unit, the first contact heating unit includes a first contact heating surface facing a back surface of the medium after printing and configured to come into contact with the back surface of the medium after printing, the back surface of the medium after printing being opposite to a printing surface of the medium after printing, a first engagement portion configured to engage with the first guide portion, and a second engagement portion configured to engage with the second guide portion, and the first contact heating unit is configured to change posture from first posture to second posture, in a state where the first engagement portion engages with the first guide portion and the second engagement portion engages with the second guide portion, by a movement from a first position where the first contact heating surface faces the back surface of the medium after printing to a second position where the first contact heating surface is more separated from the back surface of the medium after printing as compared to the first position.

According to this configuration, by the movement of the first contact heating unit from the first position to the second position, the first contact heating unit can be changed from the first posture where the first contact heating surface faces the back surface of the medium after printing to the second posture where the first contact heating surface is more separated from the back surface of the medium after printing as compared to the first posture. This makes it possible to suppress a decrease in workability of work associated with the first contact heating unit, even when space saving is attempted for the configuration of the drying unit.

(B) In the printing apparatus, the second position may be a position where the first contact heating surface is moved in a width direction intersecting the transport direction as compared to the first position.

According to this configuration, the first contact heating surface can be moved in the width direction, by the movement of the first contact heating unit from the first position to the second position. This makes it possible to suppress a decrease in the workability of work associated with the first contact heating unit, even when space saving is attempted for the disposition of the drying unit.

(C) In the printing apparatus, the second position may be a position where the first contact heating surface is more inclined as compared to the first position.

According to this configuration, the first contact heating surface can be made inclined, by the movement of the first contact heating unit from the first position to the second position. This makes it possible to suppress a decrease in the workability of work associated with the first contact heating unit, even when space saving is attempted for the disposition of the drying unit.

(D) In the printing apparatus, the first contact heating unit may be configured to change the posture from the second posture to third posture, in a state where the first engagement portion engages with the first guide portion and the second engagement portion engages with the second guide portion, by a movement from the second position to a third position where the first contact heating surface is more separated from the back surface of the medium after printing as compared to the second position.

According to this configuration, by moving the first contact heating unit from the second position to the third position, it is possible to move the first contact heating surface to a position further separated from the back surface of the medium after printing as compared to the second position. This makes it possible to suppress a decrease in the workability of work associated with the first contact heating unit, even when space saving is desired for the disposition of the drying unit.

(E) In the printing apparatus, the second position may be a position where the first contact heating surface is inclined at an angle of less than 90 degrees as compared to the first position and the third position may be a position where the first contact heating surface is inclined at an angle of 90 degrees or greater as compared to the first position. According to this configuration, the same effects as those of (D) are obtained.

(F) In the printing apparatus, the drying unit may include a first non-contact heating unit facing the first contact heating surface and configured to blow air to the printing surface of the medium after printing in a state of not being in contact with the printing surface of the medium after printing.

According to this configuration, the medium after printing is dried from the back surface by the first contact heating unit, and is dried from the printing surface by the first non-contact heating unit. Thus, drying efficiency of the medium can be improved. Therefore, quality of the medium after printing can be improved, in association with the drying of the medium after printing. In addition to this, since the first non-contact heating unit is positioned at the position facing the first contact heating surface, it is possible to suppress a decrease in the workability of work associated with the first contact heating unit, even when space saving for the configuration of the drying unit is attempted.

(G) In the printing apparatus, the drying unit may include a second contact heating unit provided inside the housing, the second contact heating unit may include a second contact heating surface facing the back surface of the medium after printing and configured to come into contact with the back surface of the medium after printing, and the second contact heating surface may be positioned facing a direction opposite to the first contact heating surface.

According to this configuration, the medium after printing is dried from the back surface by the first contact heating unit and the second contact heating unit. Thus, drying efficiency of the medium can be improved. Therefore, quality of the medium after printing can be improved, in association with the drying of the medium after printing. In addition to this, since the second contact heating unit is positioned at the position facing the direction opposite to the first contact heating surface, it is possible to suppress a decrease in the workability of work associated with the first contact heating unit, even when space saving for the configuration of the drying unit is attempted.

(H) In the printing apparatus, the first support portion may include a third guide portion provided at a position facing the second contact heating unit, the second support portion may include a fourth guide portion provided at a position facing the second contact heating unit, the second contact heating unit may include a third engagement portion configured to engage with the third guide portion and a fourth engagement portion configured to engage with the fourth guide portion, and the second contact heating unit may be configured to change posture from fourth posture to fifth posture, in a state where the third engagement portion engages with the third guide portion and the fourth engagement portion engages with the fourth guide portion, by a movement from a fourth position where the second contact heating surface faces the back surface of the medium after printing to a fifth position where the second contact heating surface is more separated from the back surface of the medium after printing as compared to the fourth position.

According to this configuration, by the movement of the second contact heating unit from the fourth position to the fifth position, the fourth posture where the second contact heating surface faces the back surface of the medium after printing can be changed to the fifth posture where the second contact heating surface is more separated from the back surface of the medium after printing as compared to the fourth posture. This makes it possible to suppress a decrease in workability of work associated with the second contact heating unit, even when space saving is attempted for the configuration of the drying unit.

(I) In the printing apparatus, the drying unit may include a second non-contact heating unit facing the second contact heating surface and configured to blow air to the printing surface of the medium after printing in a state of not being in contact with the printing surface of the medium after printing.

According to this configuration, the medium after printing is dried from the back surface by the first contact heating unit and the second contact heating unit, and is dried from the printing surface by the second non-contact heating unit. Thus, drying efficiency of the medium can be improved. Therefore, quality of the medium after printing can be improved, in association with the drying of the medium after printing. In addition to this, since the second non-contact heating unit is positioned at the position facing the second contact heating surface, it is possible to suppress a decrease in the workability of work associated with the second contact heating unit, even when space saving for the configuration of the drying unit is attempted.

(J) In the printing apparatus, the first contact heating unit and the second contact heating unit may be provided at positions overlapping each other in a vertical direction and the first contact heating unit may be provided below the second contact heating unit in the vertical direction. According to this configuration, the same effects as those of (A) are obtained.

(K) In the printing apparatus, the first position may be a position where the first contact heating surface faces downward in the vertical direction. According to this configuration, the same effects as those of (A) are obtained.

What is claimed is:

1. A printing apparatus, comprising:

a transport unit configured to transport a medium in a transport direction;

a printing unit configured to perform printing on the medium by discharging liquid onto the medium transported by the transport unit; and a drying unit configured to dry the medium after printing on which printing was performed by the printing unit, wherein the drying unit includes:

a housing, a first contact heating unit provided inside the housing, a first support portion provided inside the housing and provided at one of positions sandwiching the first contact heating unit in the transport direction, and a second support portion provided inside the housing and provided at another of the positions sandwiching the first contact heating unit in the transport direction, the first support portion and the second support portion are configured to support the first contact heating unit, the first support portion includes a first guide portion provided at a position facing the first contact heating unit, the second support portion includes a second guide portion provided at a position facing the first contact heating unit, the first contact heating unit includes:

a first contact heating surface facing a back surface of the medium after printing and configured to come into contact with the back surface of the medium after printing, the back surface of the medium after printing being opposite to a printing surface of the medium after printing, a first engagement portion configured to engage with the first guide portion, and a second engagement portion configured to engage with the second guide portion, and the first contact heating unit is configured to rotate around an axis orientated along the transport direction to change a posture from a first posture to a second posture, in a state where the first engagement portion engages with the first guide portion and the second engagement portion engages with the second guide portion, by a movement from a first position for drying the medium to a second position that is different from the first position, wherein a part of the first contact heating unit is deployed to an outside of the housing when the first contact heating unit is in the second position.

2. The printing apparatus according to claim 1, wherein the second position is a position where the first contact heating surface is moved in a width direction intersecting the transport direction as compared to the first position.

3. The printing apparatus according to claim 2, wherein the second position is a position where the first contact heating surface is more inclined as compared to the first position.

4. The printing apparatus according to claim 1, wherein the first contact heating unit is configured to rotate around the axis orientated along the transport direction to change the posture from the second posture to a third posture, in a state where the first engagement portion engages with the first guide portion and the second engagement portion engages with the second guide portion, by a movement from the second position to a third position that is different from the second position.

5. The printing apparatus according to claim 4, wherein
the second position is a position where the first contact heating surface is inclined at an angle of less than 90 degrees as compared to the first position and
the third position is a position where the first contact heating surface is inclined at an angle of 90 degrees or greater as compared to the first position.

6. The printing apparatus according to claim 4, wherein a part of the first contact heating unit is deployed to the outside of the housing further than at the second position when the first contact heating unit is in the third position.

7. The printing apparatus according to claim 1, wherein the drying unit includes a first non-contact heating unit facing the first contact heating surface and configured to blow air to the printing surface of the medium after printing in a state of not being in contact with the printing surface of the medium after printing.

8. The printing apparatus according to claim 1, wherein
the drying unit includes a second contact heating unit provided inside the housing,
the second contact heating unit includes a second contact heating surface facing the back surface of the medium after printing and configured to come into contact with the back surface of the medium after printing, and
the second contact heating surface is positioned facing a direction opposite to the first contact heating surface.

9. The printing apparatus according to claim 8, wherein
the first support portion includes a third guide portion provided at a position facing the second contact heating unit,
the second support portion includes a fourth guide portion provided at a position facing the second contact heating unit,
the second contact heating unit includes:
a third engagement portion configured to engage with the third guide portion and
a fourth engagement portion configured to engage with the fourth guide portion, and
the second contact heating unit is configured to rotate around the axis orientated along the transport direction to change the posture from a fourth posture to a fifth posture, in a state where the third engagement portion engages with the third guide portion and the fourth engagement portion engages with the fourth guide portion, by a movement from a fourth position for drying the medium to a fifth position that is different from the fourth position.

10. The printing apparatus according to claim 9, wherein a part of the second contact heating unit is deployed to the outside of the housing when the second contact heating unit is in the fifth position.

11. The printing apparatus according to claim 8, wherein the drying unit includes a second non-contact heating unit facing the second contact heating surface and configured to blow air to the printing surface of the medium after printing in a state of not being in contact with the printing surface of the medium after printing.

12. The printing apparatus according to claim 8, wherein
the first contact heating unit and the second contact heating unit are provided at positions overlapping each other in a vertical direction and
the first contact heating unit is provided below the second contact heating unit in the vertical direction.

13. The printing apparatus according to claim 1, wherein the first position is a position where the first contact heating surface faces downward in a vertical direction.

14. A printing apparatus, comprising:
a transport unit configured to transport a medium in a transport direction;
a printing unit configured to perform printing on the medium by discharging liquid onto the medium transported by the transport unit; and
a drying unit configured to dry the medium after printing on which printing was performed by the printing unit, wherein
the drying unit includes:
a housing,
a first contact heating unit provided inside the housing,
a first support portion provided inside the housing and provided at one of positions sandwiching the first contact heating unit in the transport direction, and
a second support portion provided inside the housing and provided at another of the positions sandwiching the first contact heating unit in the transport direction,
the first support portion and the second support portion are configured to support the first contact heating unit,
the first support portion includes a first guide portion provided at a position facing the first contact heating unit,
the second support portion includes a second guide portion provided at a position facing the first contact heating unit,
the first contact heating unit includes:
a first contact heating surface facing a back surface of the medium after printing and configured to come into contact with the back surface of the medium after printing, the back surface of the medium after printing being opposite to a printing surface of the medium after printing,
a first engagement portion configured to engage with the first guide portion, and
a second engagement portion configured to engage with the second guide portion, and
the first contact heating unit is configured to change a posture from a first posture to a second posture, in a state where the first engagement portion engages with the first guide portion and the second engagement portion engages with the second guide portion, by a movement from a first position where the first contact heating surface faces the back surface of the medium after printing to a second position where the first contact heating surface is more separated from the back surface of the medium after printing as compared to the first position, wherein
the drying unit includes a second contact heating unit provided inside the housing,
the second contact heating unit includes a second contact heating surface facing the back surface of the medium after printing and configured to come into contact with the back surface of the medium after printing, and
the second contact heating surface is positioned facing a direction opposite to the first contact heating surface.

15. A printing apparatus, comprising:
a transport unit configured to transport a medium in a transport direction;

a printing unit configured to perform printing on the medium by discharging liquid onto the medium transported by the transport unit; and a drying unit configured to dry the medium after printing on which printing was performed by the printing unit, wherein the drying unit includes:

a housing, a first contact heating unit provided inside the housing, a first support portion provided inside the housing and provided at one of positions sandwiching the first contact heating unit in the transport direction, and a second support portion provided inside the housing and provided at another of the positions sandwiching the first contact heating unit in the transport direction, the first support portion and the second support portion are configured to support the first contact heating unit, the first support portion includes a first guide portion provided at a position facing the first contact heating unit, the second support portion includes a second guide portion provided at a position facing the first contact heating unit, the first contact heating unit includes:

a first contact heating surface facing a back surface of the medium after printing and configured to come into contact with the back surface of the medium after printing, the back surface of the medium after printing being opposite to a printing surface of the medium after printing, a first engagement portion configured to engage with the first guide portion, and a second engagement portion configured to engage with the second guide portion, and the first contact heating unit is configured to change posture from first posture to second posture, in a state where the first engagement portion engages with the first guide portion and the second engagement portion engages with the second guide portion, by a movement from a first position where the first contact heating surface faces the back surface of the medium after printing to a second position where the first contact heating surface is more separated from the back surface of the medium after printing as compared to the first position, wherein the first contact heating unit is configured to change the posture from the second posture to third posture, in a state where the first engagement portion engages with the first guide portion and the second engagement portion engages with the second guide portion, by a movement from the second position to a third position where the first contact heating surface is more separated from the back surface of the medium after printing as compared to the second position, the second position is a position where the first contact heating surface is inclined at an angle of less than 90 degrees as compared to the first position and the third position is a position where the first contact heating surface is inclined at an angle of 90 degrees or greater as compared to the first position.

* * * * *